United States Patent
Forutanpour et al.

(10) Patent No.: US 12,462,635 B2
(45) Date of Patent: Nov. 4, 2025

(54) IDENTIFYING ELECTRONIC DEVICES USING TEMPORALLY CHANGING INFORMATION

(71) Applicant: ecoATM, LLC, San Diego, CA (US)

(72) Inventors: Babak Forutanpour, San Diego, CA (US); Ted Ray Gooding, San Diego, CA (US); Derchang Chao, San Diego, CA (US); Mazen Labban, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 701 days.

(21) Appl. No.: 17/811,548

(22) Filed: Jul. 8, 2022

(65) Prior Publication Data

US 2023/0007937 A1   Jan. 12, 2023

Related U.S. Application Data

(60) Provisional application No. 63/220,890, filed on Jul. 12, 2021, provisional application No. 63/220,381, filed on Jul. 9, 2021.

(51) Int. Cl.
*G07F 9/00* (2006.01)
*G06Q 10/30* (2023.01)
(Continued)

(52) U.S. Cl.
CPC ............ *G07F 9/009* (2020.05); *G06Q 10/30* (2013.01); *G06Q 20/18* (2013.01); *G07F 7/06* (2013.01); *G06Q 30/0283* (2013.01)

(58) Field of Classification Search
CPC .. G06Q 10/30; G06Q 30/0278; G06Q 20/327; G06Q 20/3224; G06Q 20/385;
(Continued)

(56) References Cited

U.S. PATENT DOCUMENTS 1,327,315 A   1/1920   Davies
1,730,015 A   10/1929  Rooke
(Continued)

FOREIGN PATENT DOCUMENTS

CA   2760863      11/2010
CA   2818533 A1   5/2012
(Continued)

OTHER PUBLICATIONS

US 12,190,672 B2, 01/2025, Forutanpour et al. (withdrawn)
(Continued)

*Primary Examiner* — Timothy R Waggoner
(74) *Attorney, Agent, or Firm* — Perkins Coie LLP

(57) ABSTRACT

Described are systems and methods to verify the identity of an evaluated device that has been previously identified and evaluated remotely from a reader device. The reader device obtains from an evaluated device temporally changing information, where the temporally changing information includes a unique identifier associated with the evaluated device and a proximity indication. The reader device verifies the temporally changing information by verifying that the unique identifier is contained in the temporally changing information, that the unique identifier is stored in a database associated with the reader device, and that the temporally changing information includes the proximity indication indicating that the evaluated device and the reader device are proximate to each other. Upon verifying the temporally changing information, the reader device obtains the price of the evaluated device, based on the unique identifier associated with the evaluated device. Upon obtaining the price of the evaluated device, the system compensates a user associated with the evaluated device.

24 Claims, 9 Drawing Sheets

(51) Int. Cl.
*G06Q 20/18* (2012.01)
*G06Q 30/0283* (2023.01)
*G07F 7/06* (2006.01)

(58) Field of Classification Search
CPC ............ G06Q 20/389; G06Q 20/4015; G06Q 20/409; G06Q 20/18; G06Q 20/3276; G07F 9/009; G07F 7/06; G07F 7/069; G06K 7/1417
See application file for complete search history.

(56) References Cited

U.S. PATENT DOCUMENTS

| | | | |
|---|---|---|---|
| 2,817,725 A | 12/1957 | Rochfort |
| 3,808,439 A | 4/1974 | Renius |
| 4,248,334 A | 2/1981 | Hanley et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A | 1/1996 | Moore |
| 5,533,645 A | 7/1996 | Wittern |
| 5,570,920 A | 11/1996 | Crisman et al. |
| 5,572,444 A | 11/1996 | Lentz et al. |
| 5,610,710 A | 3/1997 | Canfield et al. |
| 5,711,530 A | 1/1998 | Lewis |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,937,396 A | 8/1999 | Konya |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,216,890 B1 | 4/2001 | Rathmer |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,283,475 B1 | 9/2001 | Stubben |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,679,499 B2 | 1/2004 | Jeon |
| 6,687,679 B1 | 2/2004 | Van Luchene |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,062,454 B1 | 6/2006 | Giannini et al. |
| 7,066,767 B2 | 6/2006 | Liao |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,201,125 B2 | 4/2007 | Evans |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,343,319 B1 | 3/2008 | Jen |
| 7,407,392 B1 | 8/2008 | Cooke et al. |
| 7,408,674 B2 | 8/2008 | Moro et al. |
| 7,431,158 B2 | 10/2008 | Yamada et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,635,131 B2 | 12/2009 | Fukazawa |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,156,008 B2 | 4/2012 | Bae et al. |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,755,783 B2 | 6/2014 | Brahami et al. |

(56) References Cited

U.S. PATENT DOCUMENTS

| | | |
|---|---|---|
| 8,781,622 B2 | 7/2014 | Mockus |
| 8,806,280 B2 | 8/2014 | Stephenson |
| 8,823,794 B2 | 9/2014 | Suzuki et al. |
| 8,824,136 B1 | 9/2014 | Interian et al. |
| 8,922,643 B2 | 12/2014 | Ji et al. |
| 9,010,627 B1 | 4/2015 | Prasad et al. |
| 9,043,026 B2 | 5/2015 | Lien et al. |
| 9,075,781 B2 | 7/2015 | Matthews |
| 9,081,477 B2 | 7/2015 | Kang |
| 9,124,056 B1 | 9/2015 | Lewis, Jr. |
| 9,147,063 B1 * | 9/2015 | Florissi .................. G06F 21/34 |
| 9,153,089 B1 | 10/2015 | Hewett |
| 9,189,911 B2 | 11/2015 | Kavli et al. |
| 9,195,979 B2 | 11/2015 | Geller |
| 9,256,863 B2 | 2/2016 | Chayon et al. |
| 9,283,672 B1 | 3/2016 | Matthews |
| 9,317,989 B2 | 4/2016 | Grow et al. |
| 9,355,515 B2 | 5/2016 | Brahami et al. |
| 9,367,436 B2 | 6/2016 | Matthews |
| 9,367,982 B2 | 6/2016 | Chayun et al. |
| 9,378,606 B2 | 6/2016 | Chayun et al. |
| 9,390,442 B2 | 7/2016 | Lyle |
| 9,469,037 B2 | 10/2016 | Matthews |
| 9,497,563 B2 | 11/2016 | Hornung et al. |
| 9,578,133 B2 | 2/2017 | Matthews |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,718,196 B2 | 8/2017 | Matthews |
| 9,792,597 B1 | 10/2017 | Abbott |
| 9,818,160 B2 | 11/2017 | Bowles et al. |
| 9,858,178 B2 | 1/2018 | Matthews |
| 9,866,664 B2 * | 1/2018 | Sinha .................. H04M 1/0249 |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 9,936,331 B2 | 4/2018 | Matthews |
| 9,972,046 B2 | 5/2018 | Ackerman |
| 10,032,140 B2 | 7/2018 | Bowles et al. |
| 10,043,339 B2 | 8/2018 | Walker et al. |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,261,611 B2 | 4/2019 | Matthews |
| 10,264,426 B2 | 4/2019 | Matthews |
| 10,269,110 B2 | 4/2019 | Forutanpour et al. |
| 10,275,813 B2 | 4/2019 | Fu |
| 10,304,057 B1 | 5/2019 | Powell |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,452,527 B2 | 10/2019 | Matthews |
| 10,475,002 B2 | 11/2019 | Silva et al. |
| 10,496,963 B2 | 12/2019 | Silva et al. |
| 10,528,992 B2 | 1/2020 | Yost |
| 10,529,008 B1 | 1/2020 | Pritchard |
| 10,565,629 B2 | 2/2020 | Hartman |
| 10,572,946 B2 | 2/2020 | Bowles et al. |
| 10,600,095 B2 | 3/2020 | Ackerman |
| 10,671,367 B2 | 6/2020 | Matthews |
| 10,679,279 B2 | 6/2020 | Ward |
| 10,740,891 B1 | 8/2020 | Chen et al. |
| 10,803,527 B1 | 10/2020 | Zankat et al. |
| 10,810,732 B2 | 10/2020 | Dwivedi et al. |
| 10,824,942 B1 | 11/2020 | Bhotika et al. |
| 10,825,082 B2 | 11/2020 | Librizzi et al. |
| 10,834,555 B2 | 11/2020 | Matthews |
| 10,839,651 B2 | 11/2020 | Smart |
| 10,846,672 B2 | 11/2020 | Dion et al. |
| 10,853,873 B2 | 12/2020 | Bowles et al. |
| 10,860,122 B2 | 12/2020 | Matthews |
| 10,860,990 B2 | 12/2020 | Bowles et al. |
| 10,909,673 B2 | 2/2021 | Forutanpour et al. |
| 10,970,786 B1 | 4/2021 | Matheson et al. |
| 10,977,700 B2 | 4/2021 | Bordeleau et al. |
| 11,004,126 B1 | 5/2021 | Jacobs, II |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,122,034 B2 | 9/2021 | Cicchitto |
| 11,126,973 B2 | 9/2021 | Silva et al. |
| 11,164,000 B2 | 11/2021 | Lee et al. |
| 11,232,412 B2 | 1/2022 | Hunt et al. |
| 11,257,057 B1 | 2/2022 | Asmi et al. |
| 11,288,789 B1 | 3/2022 | Chen et al. |
| 11,302,038 B2 | 4/2022 | Muendel et al. |
| 11,315,093 B2 | 4/2022 | Bowles |
| 11,321,768 B2 | 5/2022 | Beauchamp |
| 11,328,562 B2 | 5/2022 | Smart |
| 11,341,471 B2 | 5/2022 | Dion et al. |
| 11,379,886 B1 | 7/2022 | Fields et al. |
| 11,386,740 B2 | 7/2022 | Shah |
| 11,417,068 B1 | 8/2022 | Burris et al. |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,574,182 B2 | 2/2023 | Matthews |
| 11,623,823 B1 | 4/2023 | Hoshino |
| 11,631,096 B2 | 4/2023 | Schubert et al. |
| 11,657,631 B2 | 5/2023 | Sagnoas |
| 11,836,867 B2 | 12/2023 | Sadalgi |
| 11,843,206 B2 | 12/2023 | Forutanpour et al. |
| 11,907,915 B2 | 2/2024 | Bowles et al. |
| 12,033,454 B2 | 7/2024 | Forutanpour et al. |
| 12,045,973 B2 | 7/2024 | Johnson et al. |
| 12,182,773 B2 | 12/2024 | Bowles |
| 12,198,108 B2 | 1/2025 | Bowles |
| 12,205,081 B2 * | 1/2025 | Bowles ................ G06Q 30/018 |
| 12,217,221 B2 | 2/2025 | Silva et al. |
| 12,223,684 B2 | 2/2025 | Silva et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0046122 A1 | 4/2002 | Barber |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0147656 A1 | 10/2002 | Tam |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0063527 A1 | 4/2003 | Ostwald |
| 2003/0100707 A1 | 5/2003 | Hwang et al. |
| 2003/0146898 A1 | 8/2003 | Kawasaki et al. |
| 2003/0158789 A1 | 8/2003 | Miura et al. |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0039639 A1 | 2/2004 | Walker |

(56) References Cited

U.S. PATENT DOCUMENTS

| | | |
|---|---|---|
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Weij et al. |
| 2004/0184651 A1 | 9/2004 | Nordbryhn |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0243478 A1 | 12/2004 | Walker et al. |
| 2004/0262521 A1 | 12/2004 | Devitt et al. |
| 2005/0022699 A1 | 2/2005 | Goza |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0219776 A1 | 10/2006 | Finn |
| 2006/0229108 A1 | 10/2006 | Cehelnik |
| 2006/0230013 A1 | 10/2006 | Hrle |
| 2006/0235747 A1 | 10/2006 | Hammond et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2006/0287929 A1 | 12/2006 | Bae et al. |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0271194 A1 | 11/2007 | Walker |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0228582 A1 | 9/2008 | Fordyce |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0108015 A1 | 4/2009 | Kreamer |
| 2009/0114716 A1 | 5/2009 | Ramachandran |
| 2009/0132813 A1 | 5/2009 | Schibuk |
| 2009/0145727 A1 | 6/2009 | Johns |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0191931 A1 | 7/2009 | Peck |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0174596 A1 | 7/2010 | Gilman |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0268792 A1 | 10/2010 | Butler |
| 2010/0312639 A1 | 12/2010 | Mastronardi |
| 2011/0035322 A1 | 2/2011 | Lively |
| 2011/0043628 A1 | 2/2011 | Yun |
| 2011/0047022 A1 | 2/2011 | Walker |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0082734 A1 | 4/2011 | Zhang et al. |
| 2011/0113479 A1 | 5/2011 | Ganem |
| 2011/0173576 A1 | 7/2011 | Murphy et al. |
| 2011/0191861 A1 | 8/2011 | Spears |
| 2011/0295417 A1 | 12/2011 | Smith, III |
| 2011/0296339 A1 | 12/2011 | Kang |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |

(56) References Cited

U.S. PATENT DOCUMENTS

| | | |
|---|---|---|
| 2012/0063501 A1 | 3/2012 | Aguren |
| 2012/0078413 A1 | 3/2012 | Baker |
| 2012/0095875 A1 | 4/2012 | Guthrie |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0209783 A1 | 8/2012 | Smith et al. |
| 2012/0235812 A1 | 9/2012 | De Mello et al. |
| 2012/0254046 A1 | 10/2012 | Librizzi et al. |
| 2012/0263394 A1 | 10/2012 | Fujiwara et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0169413 A1 | 7/2013 | Schuessler |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1 | 8/2013 | Panagas |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0028449 A1 | 1/2014 | Sigal et al. |
| 2014/0038556 A1 | 2/2014 | DeSousa |
| 2014/0046748 A1 | 2/2014 | Nagarajan |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0149201 A1 | 5/2014 | Abbott |
| 2014/0150100 A1 | 5/2014 | Gupta et al. |
| 2014/0156883 A1 | 6/2014 | Bowles |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0267691 A1 | 9/2014 | Humphrey |
| 2014/0273245 A1 | 9/2014 | Ochranek et al. |
| 2014/0278244 A1 | 9/2014 | Humphrey et al. |
| 2014/0297368 A1 | 10/2014 | Ferder |
| 2014/0316561 A1 | 10/2014 | Tkachenko |
| 2014/0330685 A1 | 11/2014 | Nazzari |
| 2014/0347473 A1 | 11/2014 | Wolff et al. |
| 2015/0006281 A1 | 1/2015 | Takahashi |
| 2015/0046343 A1 | 2/2015 | Martini |
| 2015/0066677 A1 | 3/2015 | Bowles et al. |
| 2015/0073590 A1 | 3/2015 | Garcia |
| 2015/0088698 A1 | 3/2015 | Ackerman |
| 2015/0088731 A1 | 3/2015 | Ackerman |
| 2015/0105901 A1 | 4/2015 | Joshi |
| 2015/0120485 A1 | 4/2015 | Nash |
| 2015/0161714 A1 | 6/2015 | Fainshtein |
| 2015/0170237 A1 | 6/2015 | Powell |
| 2015/0177330 A1 | 6/2015 | Morris |
| 2015/0193797 A1 | 7/2015 | Gerrity |
| 2015/0206200 A1 | 7/2015 | Edmondson et al. |
| 2015/0249353 A1 | 9/2015 | Hamilton |
| 2015/0278529 A1 | 10/2015 | Cho et al. |
| 2015/0293860 A9 | 10/2015 | Bowles |
| 2015/0294278 A1 | 10/2015 | Nguyen |
| 2015/0309912 A1 | 10/2015 | Nguyen et al. |
| 2015/0317619 A1 | 11/2015 | Curtis |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0253861 A1 | 9/2016 | Seo |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0292710 A1 | 10/2016 | Casselle |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0011374 A1 | 1/2017 | McDivitt |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |
| 2017/0142484 A1 | 5/2017 | Jeon |
| 2017/0169401 A1 | 6/2017 | Beane et al. |
| 2017/0221110 A1 | 8/2017 | Sullivan et al. |
| 2017/0256051 A1 | 9/2017 | Dwivedi et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0343481 A1 | 11/2017 | Jahanshahi et al. |
| 2018/0084094 A1 | 3/2018 | Sinha et al. |
| 2018/0101810 A1 | 4/2018 | Feng et al. |
| 2018/0122022 A1 | 5/2018 | Kelly |
| 2018/0157246 A1 | 6/2018 | Huang et al. |
| 2018/0157820 A1 | 6/2018 | Adams et al. |
| 2018/0160269 A1 | 6/2018 | Baarman et al. |
| 2018/0165655 A1 | 6/2018 | Marcelle et al. |
| 2018/0240144 A1 | 8/2018 | Curtis |
| 2018/0255047 A1 | 9/2018 | Cicchitto |
| 2018/0293566 A1 | 10/2018 | Engles et al. |
| 2018/0293664 A1 | 10/2018 | Zhang et al. |
| 2018/0300776 A1 | 10/2018 | Yost |
| 2018/0321163 A1 | 11/2018 | Casadio |
| 2018/0322623 A1 | 11/2018 | Memo et al. |
| 2018/0342050 A1 | 11/2018 | Fitzgerald et al. |
| 2018/0350163 A1 | 12/2018 | Pofale et al. |
| 2018/0365744 A1 | 12/2018 | Lennon |
| 2019/0017863 A1 | 1/2019 | Saltzman |
| 2019/0019147 A1 | 1/2019 | McCarty et al. |
| 2019/0051090 A1 | 2/2019 | Goldberg et al. |
| 2019/0066075 A1 | 2/2019 | Lobo et al. |
| 2019/0066439 A1 | 2/2019 | Pinkus |
| 2019/0073566 A1 | 3/2019 | Brauer |
| 2019/0073568 A1 | 3/2019 | He et al. |
| 2019/0102874 A1 | 4/2019 | Goja |
| 2019/0156611 A1 | 5/2019 | Redhead |
| 2019/0166278 A1 | 5/2019 | Hiyama et al. |
| 2019/0222748 A1 | 7/2019 | Weir et al. |
| 2019/0272628 A1 | 9/2019 | Tsou |
| 2019/0279181 A1 | 9/2019 | Kelly |
| 2019/0279431 A1 | 9/2019 | Wurmfeld et al. |
| 2019/0287141 A1* | 9/2019 | Bordeleau ............ G06Q 20/18 |
| 2019/0318465 A1 | 10/2019 | Nguyen |

(56) References Cited

U.S. PATENT DOCUMENTS

| | | |
|---|---|---|
| 2019/0372827 A1 | 12/2019 | Vasseur et al. |
| 2019/0375300 A1 | 12/2019 | Lyon |
| 2020/0020097 A1 | 1/2020 | Do et al. |
| 2020/0042795 A1 | 2/2020 | Lee et al. |
| 2020/0042969 A1 | 2/2020 | Ray |
| 2020/0066067 A1 | 2/2020 | Herman et al. |
| 2020/0090137 A1 | 3/2020 | Bowles et al. |
| 2020/0104028 A1 | 4/2020 | Vats |
| 2020/0104720 A1 | 4/2020 | Boa et al. |
| 2020/0104868 A1 | 4/2020 | Schubert et al. |
| 2020/0175481 A1 | 6/2020 | Pham |
| 2020/0175669 A1 | 6/2020 | Bian et al. |
| 2020/0202319 A1 | 6/2020 | Forutanpour et al. |
| 2020/0202405 A1 | 6/2020 | Glickman et al. |
| 2020/0202419 A1 | 6/2020 | Beauchamp |
| 2020/0241891 A1 | 7/2020 | Li et al. |
| 2020/0265487 A1 | 8/2020 | Forutanpour et al. |
| 2020/0265666 A1 | 8/2020 | Yamamiya |
| 2020/0286030 A1 | 9/2020 | Hewett |
| 2020/0342442 A1 | 10/2020 | Curtis |
| 2020/0387881 A1 | 12/2020 | Smith |
| 2020/0393742 A1 | 12/2020 | Dion et al. |
| 2020/0410793 A1 | 12/2020 | Folco |
| 2021/0012315 A1 | 1/2021 | Priebatsch |
| 2021/0081698 A1 | 3/2021 | Lindeman et al. |
| 2021/0081914 A1 | 3/2021 | Nelms et al. |
| 2021/0110366 A1 | 4/2021 | Dion et al. |
| 2021/0110440 A1* | 4/2021 | Dion .............. G06Q 30/018 |
| 2021/0150773 A1 | 5/2021 | Muendel et al. |
| 2021/0174312 A1 | 6/2021 | Bowles et al. |
| 2021/0192484 A1 | 6/2021 | Forutanpour et al. |
| 2021/0209512 A1 | 7/2021 | Gaddam et al. |
| 2021/0209746 A1 | 7/2021 | Johnson et al. |
| 2021/0217076 A1 | 7/2021 | Kruper et al. |
| 2021/0224867 A1 | 7/2021 | Bordeleau et al. |
| 2021/0247016 A1 | 8/2021 | Affentranger |
| 2021/0254966 A1 | 8/2021 | Hur et al. |
| 2021/0255240 A1 | 8/2021 | McGrath |
| 2021/0264483 A1 | 8/2021 | Hirata |
| 2021/0272208 A1 | 9/2021 | Leise et al. |
| 2021/0278338 A1 | 9/2021 | Jung |
| 2021/0295494 A1 | 9/2021 | Forutanpour et al. |
| 2021/0327203 A1 | 10/2021 | Shah |
| 2021/0343030 A1 | 11/2021 | Sagnoas |
| 2021/0357545 A1 | 11/2021 | Sugawara et al. |
| 2022/0027879 A1 | 1/2022 | Bowles et al. |
| 2022/0050897 A1 | 2/2022 | Gaddam et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0051514 A1 | 2/2022 | Schmidt |
| 2022/0067798 A1 | 3/2022 | Forutanpour et al. |
| 2022/0068076 A1 | 3/2022 | Forutanpour et al. |
| 2022/0084296 A1 | 3/2022 | Sadalgi |
| 2022/0114854 A1 | 4/2022 | Forutanpour et al. |
| 2022/0164833 A1 | 5/2022 | Dion et al. |
| 2022/0172178 A1 | 6/2022 | Forutanpour et al. |
| 2022/0187802 A1 | 6/2022 | Wittenberg et al. |
| 2022/0198407 A1 | 6/2022 | Beane et al. |
| 2022/0254216 A1 | 8/2022 | Schwarzli |
| 2022/0262189 A1 | 8/2022 | Dion et al. |
| 2022/0277281 A1 | 9/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0051060 A1 | 2/2023 | Nitu |
| 2023/0077844 A1 | 3/2023 | Bowles et al. |
| 2023/0100849 A1 | 3/2023 | Bowles et al. |
| 2023/0188998 A1 | 6/2023 | Zellner et al. |
| 2023/0196865 A1 | 6/2023 | Forutanpour et al. |
| 2023/0215109 A1 | 7/2023 | Ha |
| 2023/0238751 A1 | 7/2023 | Forutanpour et al. |
| 2023/0259910 A1 | 8/2023 | Forutanpour et al. |
| 2023/0264871 A1 | 8/2023 | Williams et al. |
| 2023/0274346 A1 | 8/2023 | Bowles et al. |
| 2023/0297973 A1 | 9/2023 | Bowles et al. |
| 2023/0297974 A1 | 9/2023 | Bowles et al. |
| 2023/0306384 A1 | 9/2023 | Bowles et al. |
| 2023/0371729 A1 | 11/2023 | Williams et al. |
| 2023/0394904 A1 | 12/2023 | Forutanpour et al. |
| 2024/0005289 A1 | 1/2024 | Silva et al. |
| 2024/0087276 A1 | 3/2024 | Silva et al. |
| 2024/0144461 A1 | 5/2024 | Forutanpour et al. |
| 2024/0185317 A1 | 6/2024 | Forutanpour et al. |
| 2024/0249251 A1 | 7/2024 | Bowles |
| 2024/0249321 A1 | 7/2024 | Forutanpour et al. |
| 2024/0265364 A1 | 8/2024 | Forutanpour et al. |
| 2024/0265470 A1 | 8/2024 | Bowles et al. |
| 2024/0289753 A1 | 8/2024 | Bowles |
| 2024/0312284 A1 | 9/2024 | Dion |
| 2024/0321033 A1 | 9/2024 | Forutanpour et al. |
| 2024/0322599 A1 | 9/2024 | Bober |
| 2024/0333032 A1 | 10/2024 | Bober |
| 2024/0346463 A1 | 10/2024 | Hunt et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 102654927 | 8/2012 |
| CN | 202394296 | 8/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 105488702 A | 4/2016 |
| CN | 205129815 U | 4/2016 |
| CN | 205132514 U | 4/2016 |
| CN | 205140067 U | 4/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |
| CN | 106911159 A | 6/2017 |

(56) References Cited

FOREIGN PATENT DOCUMENTS

| | | | |
|---|---|---|---|
| CN | 304169301 | S | 6/2017 |
| CN | 206440635 | U | 8/2017 |
| CN | 107220640 | A | 9/2017 |
| CN | 206466691 | U | 9/2017 |
| CN | 107514978 | A | 12/2017 |
| CN | 206861374 | U | 1/2018 |
| CN | 207037788 | U | 2/2018 |
| CN | 105444678 | B | 3/2018 |
| CN | 304702339 | S | 6/2018 |
| CN | 304702340 | S | 6/2018 |
| CN | 304747709 | S | 7/2018 |
| CN | 304795309 | S | 8/2018 |
| CN | 108596658 | A | 9/2018 |
| CN | 207854959 | U | 9/2018 |
| CN | 108647588 | A | 10/2018 |
| CN | 207993120 | U | 10/2018 |
| CN | 207993121 | U | 10/2018 |
| CN | 207995226 | U | 10/2018 |
| CN | 304842785 | S | 10/2018 |
| CN | 108764236 | A | 11/2018 |
| CN | 208086545 | U | 11/2018 |
| CN | 208172834 | U | 11/2018 |
| CN | 208176564 | U | 12/2018 |
| CN | 304958348 | S | 12/2018 |
| CN | 305014434 | S | 1/2019 |
| CN | 305014435 | S | 1/2019 |
| CN | 109831575 | A | 5/2019 |
| CN | 208819255 | U | 5/2019 |
| CN | 208819289 | U | 5/2019 |
| CN | 208819290 | U | 5/2019 |
| CN | 208969761 | U | 6/2019 |
| CN | 305275610 | S | 7/2019 |
| CN | 110333876 | A | 10/2019 |
| CN | 110347341 | A | 10/2019 |
| CN | 110595361 | A | 12/2019 |
| CN | 110653162 | A | 1/2020 |
| CN | 110675399 | A | 1/2020 |
| CN | 110751002 | A | 2/2020 |
| CN | 110788015 | A | 2/2020 |
| CN | 110796646 | A | 2/2020 |
| CN | 110796647 | A | 2/2020 |
| CN | 110796669 | A | 2/2020 |
| CN | 110827244 | A | 2/2020 |
| CN | 110827245 | A | 2/2020 |
| CN | 110827246 | A | 2/2020 |
| CN | 110827247 | A | 2/2020 |
| CN | 110827248 | A | 2/2020 |
| CN | 110827249 | A | 2/2020 |
| CN | 110880028 | A | 3/2020 |
| CN | 110928730 | A | 3/2020 |
| CN | 305638504 | S | 3/2020 |
| CN | 110976302 | A | 4/2020 |
| CN | 111009073 | A | 4/2020 |
| CN | 111080184 | A | 4/2020 |
| CN | 210348162 | U | 4/2020 |
| CN | 111175318 | A | 5/2020 |
| CN | 111210473 | A | 5/2020 |
| CN | 305767220 | S | 5/2020 |
| CN | 111238430 | A | 6/2020 |
| CN | 111262987 | A | 6/2020 |
| CN | 111272067 | A | 6/2020 |
| CN | 111272388 | A | 6/2020 |
| CN | 111272393 | A | 6/2020 |
| CN | 111273704 | A | 6/2020 |
| CN | 111277466 | A | 6/2020 |
| CN | 111277659 | A | 6/2020 |
| CN | 111277695 | A | 6/2020 |
| CN | 111277696 | A | 6/2020 |
| CN | 111290660 | A | 6/2020 |
| CN | 111290949 | A | 6/2020 |
| CN | 111291661 | A | 6/2020 |
| CN | 111292302 | A | 6/2020 |
| CN | 111294454 | A | 6/2020 |
| CN | 111294459 | A | 6/2020 |
| CN | 111307429 | A | 6/2020 |
| CN | 111311556 | A | 6/2020 |
| CN | 111311687 | A | 6/2020 |
| CN | 111311749 | A | 6/2020 |
| CN | 111314445 | A | 6/2020 |
| CN | 111314535 | A | 6/2020 |
| CN | 111325715 | A | 6/2020 |
| CN | 111325716 | A | 6/2020 |
| CN | 111325717 | A | 6/2020 |
| CN | 111325901 | A | 6/2020 |
| CN | 210666955 | U | 6/2020 |
| CN | 305818424 | S | 6/2020 |
| CN | 111439560 | A | 7/2020 |
| CN | 211149556 | U | 7/2020 |
| CN | 305955503 | S | 7/2020 |
| CN | 211291337 | U | 8/2020 |
| CN | 211296771 | U | 8/2020 |
| CN | 211402187 | U | 9/2020 |
| CN | 211515235 | U | 9/2020 |
| CN | 211538600 | U | 9/2020 |
| CN | 111830293 | A | 10/2020 |
| CN | 111830354 | A | 10/2020 |
| CN | 111860890 | A | 10/2020 |
| CN | 111860891 | A | 10/2020 |
| CN | 211630227 | U | 10/2020 |
| CN | 306113050 | S | 10/2020 |
| CN | 306113051 | S | 10/2020 |
| CN | 306113052 | S | 10/2020 |
| CN | 212023984 | U | 11/2020 |
| CN | 212031269 | U | 11/2020 |
| CN | 306164092 | S | 11/2020 |
| CN | 306164093 | S | 11/2020 |
| CN | 306164094 | S | 11/2020 |
| CN | 306164095 | S | 11/2020 |
| CN | 112098443 | A | 12/2020 |
| CN | 212084259 | U | 12/2020 |
| CN | 212268703 | U | 1/2021 |
| CN | 212314534 | U | 1/2021 |
| CN | 212322247 | U | 1/2021 |
| CN | 212364464 | U | 1/2021 |
| CN | 306272538 | S | 1/2021 |
| CN | 306283626 | S | 1/2021 |
| CN | 112348761 | A | 2/2021 |
| CN | 112348808 | A | 2/2021 |
| CN | 112393880 | A | 2/2021 |
| CN | 112395118 | A | 2/2021 |
| CN | 212460662 | U | 2/2021 |
| CN | 212586854 | U | 2/2021 |
| CN | 212597202 | U | 2/2021 |
| CN | 306323627 | S | 2/2021 |
| CN | 112433902 | A | 3/2021 |
| CN | 112452935 | A | 3/2021 |
| CN | 112455988 | A | 3/2021 |
| CN | 112456100 | A | 3/2021 |
| CN | 112565505 | A | 3/2021 |
| CN | 212677296 | U | 3/2021 |
| CN | 212681731 | U | 3/2021 |
| CN | 111314537 | B | 4/2021 |
| CN | 112613622 | A | 4/2021 |
| CN | 112613914 | A | 4/2021 |
| CN | 112614117 | A | 4/2021 |
| CN | 112614269 | A | 4/2021 |
| CN | 112633194 | A | 4/2021 |
| CN | 112634245 | A | 4/2021 |
| CN | 112634288 | A | 4/2021 |
| CN | 112634301 | A | 4/2021 |
| CN | 112672145 | A | 4/2021 |
| CN | 112735081 | A | 4/2021 |
| CN | 213001252 | U | 4/2021 |
| CN | 213004872 | U | 4/2021 |
| CN | 112777290 | A | 5/2021 |
| CN | 112783702 | A | 5/2021 |
| CN | 112816490 | A | 5/2021 |
| CN | 112822740 | A | 5/2021 |
| CN | 112828842 | A | 5/2021 |
| CN | 112837076 | A | 5/2021 |
| CN | 112837102 | A | 5/2021 |
| CN | 213149008 | U | 5/2021 |
| CN | 213301455 | U | 5/2021 |
| CN | 213301535 | U | 5/2021 |

(56) References Cited

FOREIGN PATENT DOCUMENTS

| | | |
|---|---|---|
| CN | 213305483 U | 5/2021 |
| CN | 112907182 A | 6/2021 |
| CN | 112991614 A | 6/2021 |
| CN | 113032198 A | 6/2021 |
| CN | 113034481 A | 6/2021 |
| CN | 113034493 A | 6/2021 |
| CN | 113034529 A | 6/2021 |
| CN | 113034530 A | 6/2021 |
| CN | 113034531 A | 6/2021 |
| CN | 113038012 A | 6/2021 |
| CN | 113052798 A | 6/2021 |
| CN | 113110806 A | 7/2021 |
| CN | 113114794 A | 7/2021 |
| CN | 113132523 A | 7/2021 |
| CN | 113160494 A | 7/2021 |
| CN | 113190215 A | 7/2021 |
| CN | 113191789 A | 7/2021 |
| CN | 213765490 U | 7/2021 |
| CN | 213796595 U | 7/2021 |
| CN | 213807304 U | 7/2021 |
| CN | 306700330 S | 7/2021 |
| CN | 113220647 A | 8/2021 |
| CN | 113220648 A | 8/2021 |
| CN | 113237473 A | 8/2021 |
| CN | 113238680 A | 8/2021 |
| CN | 113238905 A | 8/2021 |
| CN | 113252678 A | 8/2021 |
| CN | 113254292 A | 8/2021 |
| CN | 113254293 A | 8/2021 |
| CN | 113254294 A | 8/2021 |
| CN | 113268162 A | 8/2021 |
| CN | 113298078 A | 8/2021 |
| CN | 113301202 A | 8/2021 |
| CN | 113329222 A | 8/2021 |
| CN | 213917879 U | 8/2021 |
| CN | 213933659 U | 8/2021 |
| CN | 306744667 S | 8/2021 |
| CN | 306744668 S | 8/2021 |
| CN | 306786433 S | 8/2021 |
| CN | 306786434 S | 8/2021 |
| CN | 113422860 A | 9/2021 |
| CN | 214160736 U | 9/2021 |
| CN | 214162705 U | 9/2021 |
| CN | 214427985 U | 10/2021 |
| CN | 113591066 A | 11/2021 |
| CN | 113591963 A | 11/2021 |
| CN | 113808322 A | 12/2021 |
| CN | 215246545 U | 12/2021 |
| CN | 215247165 U | 12/2021 |
| CN | 215247245 U | 12/2021 |
| CN | 215247426 U | 12/2021 |
| CN | 215262785 U | 12/2021 |
| CN | 215262787 U | 12/2021 |
| CN | 215266884 U | 12/2021 |
| CN | 215266954 U | 12/2021 |
| CN | 215325354 U | 12/2021 |
| CN | 113887609 A | 1/2022 |
| CN | 113901996 A | 1/2022 |
| CN | 113947445 A | 1/2022 |
| CN | 215555043 U | 1/2022 |
| CN | 215556081 U | 1/2022 |
| CN | 215575427 U | 1/2022 |
| CN | 215576764 U | 1/2022 |
| CN | 215576765 U | 1/2022 |
| CN | 114038114 A | 2/2022 |
| CN | 114063364 A | 2/2022 |
| CN | 114066367 A | 2/2022 |
| CN | 215703219 U | 2/2022 |
| CN | 215708961 U | 2/2022 |
| CN | 114155260 A | 3/2022 |
| CN | 114170419 A | 3/2022 |
| CN | 114170435 A | 3/2022 |
| CN | 114186702 A | 3/2022 |
| CN | 114219105 A | 3/2022 |
| CN | 114281627 A | 4/2022 |
| CN | 114298204 A | 4/2022 |
| CN | 114298345 A | 4/2022 |
| CN | 114299293 A | 4/2022 |
| CN | 114299657 A | 4/2022 |
| CN | 114328051 A | 4/2022 |
| CN | 114330533 A | 4/2022 |
| CN | 114330534 A | 4/2022 |
| CN | 114332016 A | 4/2022 |
| CN | 114371417 A | 4/2022 |
| CN | 114374795 A | 4/2022 |
| CN | 114386629 A | 4/2022 |
| CN | 114494856 A | 5/2022 |
| CN | 216612155 U | 5/2022 |
| CN | 216751854 U | 6/2022 |
| CN | 216751855 U | 6/2022 |
| CN | 217133280 U | 8/2022 |
| CN | 217133770 U | 8/2022 |
| CN | 217550626 U | 10/2022 |
| CN | 217589621 U | 10/2022 |
| CN | 307592104 S | 10/2022 |
| CN | 217820056 U | 11/2022 |
| CN | 113870223 A | 12/2022 |
| CN | 218260123 U | 1/2023 |
| CN | 112672145 B | 2/2023 |
| CN | 218497120 U | 2/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| GB | 202209941 | 7/2022 |
| GR | 20210100761 | 7/2022 |
| HK | 30014296 A | 8/2020 |
| JP | 7112801 | 5/1995 |
| JP | H7334583 | 12/1995 |
| JP | H11242005 | 9/1999 |
| JP | H11334851 A | 12/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004226129 A | 8/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008059403 A | 3/2008 |

(56) References Cited

FOREIGN PATENT DOCUMENTS

| | | |
|---|---|---|
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2014513829 A | 6/2014 |
| JP | 2015505999 A | 2/2015 |
| JP | 2016504900 | 2/2016 |
| JP | 6050922 B2 | 12/2016 |
| JP | 2017040957 A | 2/2017 |
| JP | 2017093938 | 6/2017 |
| JP | 2017142781 A | 8/2017 |
| JP | 2017173902 A | 9/2017 |
| JP | 2017201559 A | 11/2017 |
| JP | 6266065 B1 | 3/2018 |
| JP | 2018520453 A | 7/2018 |
| JP | 2019012474 | 1/2019 |
| JP | 3223233 U | 9/2019 |
| JP | 2020526847 A | 8/2020 |
| JP | 2021530786 A | 11/2021 |
| JP | 2022539909 A | 9/2022 |
| JP | 2022539910 A | 9/2022 |
| JP | 2022539912 A | 9/2022 |
| JP | 2022545336 A | 9/2022 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |
| KR | 1020190107594 | 9/2019 |
| KR | 1020200115308 | 10/2020 |
| KR | 20210020717 | 2/2021 |
| KR | 1020210059148 | 5/2021 |
| KR | 1020210107515 | 9/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | 2005054877 A1 | 6/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | 2016196175 A1 | 12/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | 2019008943 A1 | 4/2020 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |
| WO | WO2022034298 | 2/2022 |
| WO | WO2022090999 | 5/2022 |
| WO | WO2022091000 | 5/2022 |
| WO | 2023073248 | 5/2023 |

OTHER PUBLICATIONS

2006 Florida Statutes Title XXXIII, Chapter 538, Sections 538.03 and 538.04, 7 pages.

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-lcd-burn-ins-and-deadstuck-pixels/.

(56) References Cited

OTHER PUBLICATIONS

Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Draft IDS 10/26ress Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4): 493-504.
Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
International Numbering Plan. Retrieved on Apr. 5, 2013 at <http://web.archive.org/web/20070322214125/http://www.numberingplans.com/?page+analysis&sub+imeinr>, 2 pages.
International Search Report and Written Opinion mailed Nov. 2, 2022 in International Application No. PCT/US2022/073570, 13 pages.
Investopedia: What's the difference between weighted average accounting and FIFO/LILO accounting methods? Aug. 19, 2010. Accessed via archive.org[https://web.archive.org/web/20100819200402/http://www.investopedia.com/ask/answers/09/weighted-average-fifo-lilo-accounting.asp].
Kanter, James Max, "Color Crack: Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iphone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" Pylmage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications Ab, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Tech Spurt, "Sandisk iXpand Review | Wireless Charger & Auto Photo Backup!" https://www.youtube.com/watch?v=zemKQ6xIJLww, Aug. 21, 2019, 1 page.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.
Grose, Thomas; "New Life for Old Phones," ASE Prism 22.3 (2012): 18.
Hassan, et al.; "A Novel Cascaded Deep Neural Network for Analyzing Smart Phone Data for Indoor Localization", Dec. 2019, vol. 101, pp. 760-769, Future Generation Computer Systems.
Hazelwood, et al.; "Life Extension of Electronic Products: A Case Study of Smartphones", Sep. 20, 2021, IEEE Access, vol. 9, pages 144726-144739, DOI: 10.1109/ACCESS.2021.3121733.
Kuriyan, et al.: "Review of Research on Rural PC Kiosks," Apr. 14, 2007, 22 pages, retrieved at http://research.microsoft.com/research/tern/kiosks.

(56) References Cited

OTHER PUBLICATIONS

Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
Park, et al., "Ambiguous Surface Defect Image Classification of AMOLED Displays in Smartphones", Jan. 26, 2016, IEEE Transactions on Industrial Informatics, vol. 12, Issue 2, pp. 597-607, DOI: 10.1109/TII.2016.2522191.
TecAce Software: "Android Smartphone Testing App—Movaluate—TecAce Software | PRLog" Internet Article, May 6, 2013, XP093222769, retrieved from the Internet: URL: https://www.priog.org/12132313-android-smartphone-testing-app-movaluate.html.
WATSON; "Review: SanDisk iXpand Wireless Charger" Sep. 15, 2019, 4 pages retrieved at https:/www.whatmobile.net ixpand-wireless-charger.

* cited by examiner

IDENTIFYING ELECTRONIC DEVICES USING TEMPORALLY CHANGING INFORMATION

CROSS-REFERENCE TO RELATED APPLICATION(S)

This application claims the benefit of U.S. Provisional Patent Application No. 63/220,381, filed Jul. 9, 2021, and U.S. Provisional Patent Application No. 63/220,890, filed Jul. 12, 2021, both of which are incorporated by reference in their entireties herein.

TECHNICAL FIELD

The present disclosure is directed generally to methods and systems for evaluating and recycling mobile phones and other consumer devices and, more particularly, to hardware and/or software for facilitating device identification, evaluation, purchase, and/or other processes associated with electronic device recycling.

BACKGROUND

Electronic devices, such as mobile phones, laptop computers, notebooks, tablets, PDAs, MP3 players, wearable smart devices, etc., are ubiquitous. Currently there are over 14 billion mobile devices in use in the world. In other words, there are more mobile devices in use than there are people on the planet. Part of the reason for the rapid growth in the number of consumer electronic devices is the rapid pace at which these devices evolve, and the increased usage of such devices in Third World countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the United States alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and other electronic devices typically contain substances that can be harmful to the environment, such as arsenic, lithium, cadmium, copper, lead, mercury, and zinc. If not properly disposed of, these toxic substances can seep into groundwater from decomposing landfills and contaminate the soil with potentially harmful consequences for humans and the environment.

As an alternative to retailer trade-in or buyback programs, consumers can also recycle, exchange, and/or sell their used mobile phones using self-service kiosks located in malls, retail stores, or other publicly accessible areas. Such kiosks are operated by ecoATM, LLC, the assignee of the present application, and aspects of these kiosks are described in, for example: U.S. Pat. Nos. 7,881,965, 8,195,511, 8,200,533, 8,239,262, 8,423,404, and 8,463,646, which are incorporated herein by reference in their entireties.

There continues to be a need for improving the means available to consumers for recycling or reselling their mobile phones and other electronic devices. Simplifying the recycling/reselling process, enhancing the consumer experience, and discouraging fraud can incentivize consumers to dispose of their old electronic devices in an efficient and environmentally conscientious way.

Figure 1:
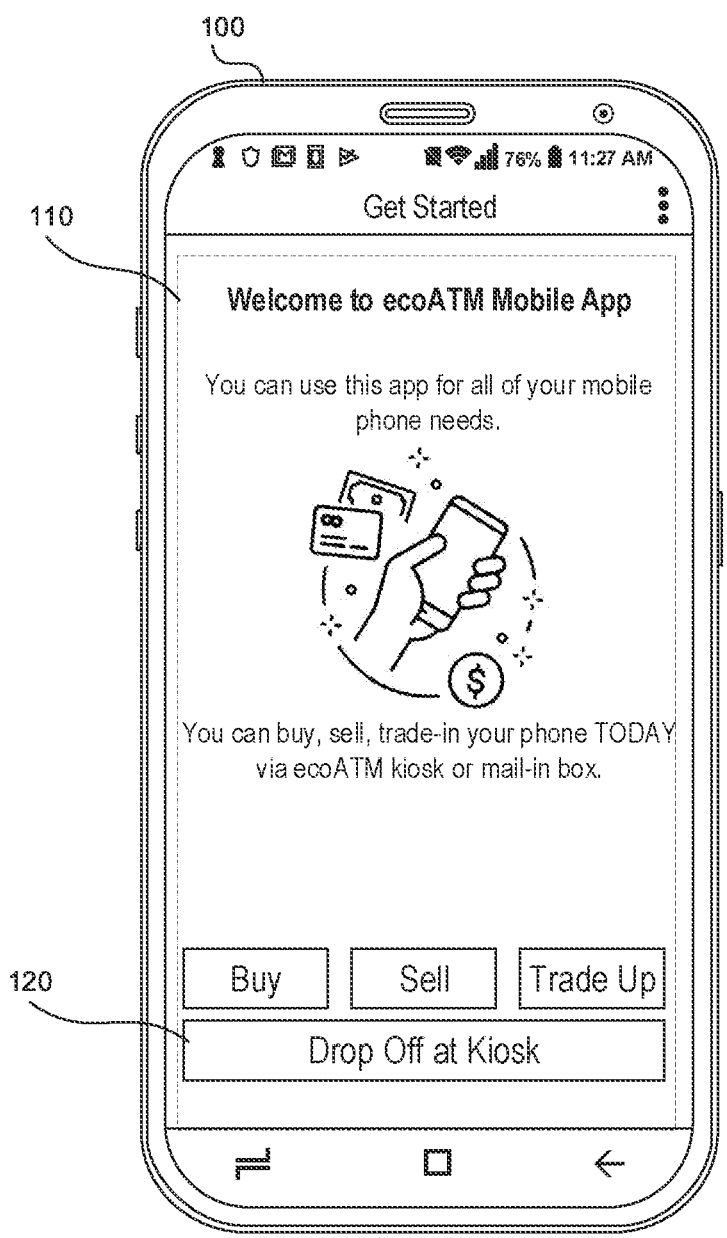
FIG. 1 shows a user interface presented by a mobile application to enable a user to evaluate and recycle/sell/exchange a mobile phone or other electronic device, in accordance with some embodiments of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The following disclosure describes various embodiments of hardware and/or software systems and methods that facilitate the identification, evaluation, purchase, and/or other processes associated with recycling of mobile phones and/or other electronic devices.

In various embodiments, for example, the systems and methods described in detail herein enable a user to evaluate a condition of a mobile phone or other electronic device (an "evaluated device"), and enable a kiosk or other "reader" device to properly identify the electronic device when it is presented to the reader device for sale or other processing. Examples of electronic devices include, but are not limited to all manner of mobile phones; smartphones; handheld devices; personal digital assistants (PDAs); tablets; MP3 or other digital music players; notebooks, Ultrabooks and laptop computers; e-readers; all types of cameras; larger consumer electronic devices, such as desktop computers; etc. Upon evaluation of the electronic device, the system can determine an estimated price for the evaluated device and present the estimated price to the user. If the user accepts the price, the user can present the evaluated device to a reader device (e.g., a kiosk for recycling electronic devices) that verifies that the presented device is the one previously evaluated. Upon verification, the user can submit the evaluated device for sale, exchange, return, donation, etc.

To prevent the user from remotely evaluating a first device and then presenting a second device (e.g., a less valuable second device) for sale in place of the originally evaluated first device, the system implements temporally changing information that enables a reader device to confirm the identity of the presented device. Examples of reader devices include, but are not limited to kiosks, mobile phones and other electronic devices, and so on. The reader device can obtain the temporally changing information from the presented device, where the temporally changing information can include a set of periodically or otherwise temporally changing indicia.

In some embodiments, an indicator in the set of temporally changing indicia is based on a prior indicator in the set of temporally changing indicia. Examples of indicia types include, but are not limited to one or more of: QR codes; bar codes; audio information; visual information; video information; electromagnetic information; such as radiofrequency information; infrared information; vibration information (e.g., vibration pattern(s)); and so on. In some embodiments, an indicator comprises a collection of two or more different indicia types. For example, an indicator in the set of temporally changing indicia can comprise a QR code and a high-frequency audio signal.

Each indicator in the set of temporally changing indicia can include, for example, a unique identifier associated with the evaluated device and a proximity indication that the evaluated device is proximate to the reader device (e.g., positioned directly in front of the reader device). The reader device verifies a subset of indices in the set of temporally changing indicia by performing one or more of the following steps: The reader device obtains an indicator and a prior occurring indicator (e.g., the previous index) in the set of temporally changing indicia. The reader device verifies that both indicia include the same unique identifier value. The reader device can also verify that the unique identifier value is stored in a database associated with the reader device. If the unique identifier is not stored in the associated database, the reader device determines that the evaluated device has not been previously evaluated. Conversely, if the unique identifier is stored in the associated database, then the reader device determines that the evaluated device has been previously evaluated. The reader device can then verify that the presented device is located proximate to the reader device by verifying that both indicia contain a proximity indication that the evaluated device is proximate to the reader device. Finally, the reader device verifies that the indicator in the set of temporally changing indicia is based on one or more prior indicia in the set of temporally changing indicia. Upon verifying the identity of the evaluated device, the reader device can then obtain a price of the evaluated device and facilitate payment of compensation to the user associated with the device, after the user submits the device for resale/recycling/exchange, etc.

Certain details are set forth in the following description and in FIGS. 1-7 to provide a thorough understanding of various embodiments of the present technology. In other instances, well-known structures, materials, operations, and/or systems often associated with smartphones and other handheld devices, consumer electronic devices, computer hardware, software, and network systems, etc., are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 100 is first introduced and discussed with reference to FIG. 1.

FIG. 1 shows a user interface presented by a schematically shown mobile application 110 to enable a user to evaluate and recycle/sell/exchange an electronic device (e.g., a mobile phone), in accordance with some embodiments of the present technology. For example, a user in possession of an electronic device 100, that the user wants to recycle, sell, or exchange via a reader device, can download the mobile application onto the device 100. The reader device can be, for example, an automated kiosk (e.g., the kiosk 200 in FIG. 2), or another electronic device (e.g., "the evaluator device" 300 in FIG. 3).

Once downloaded at the electronic device 100, the application can receive and record input from the device 100 and/or the user regarding the user and/or the device 100 characteristics. For example, the application 110 can record the International Mobile Equipment Identity (IMEI), serial number, and/or other unique identifiers 260 of FIG. 2 from the evaluated device 100. The unique identifier 260 can include a subscriber identity module (SIM) number associated with the evaluated device, an International Mobile Subscriber Identity (IMSI), a Mobile Subscriber ISDN Number (MSISDN). The user can also be instructed to perform one or more tests, such as touchscreen, display, global positioning system (GPS), microphone, and/or speaker tests, while the application is active on the device 100 to capture the device's make, model, device condition, and so on. The application 110 can use the captured data to generate a price quote based on the make, model, condition, and any additional identified characteristics from the evaluated device 100.

Figure 2:
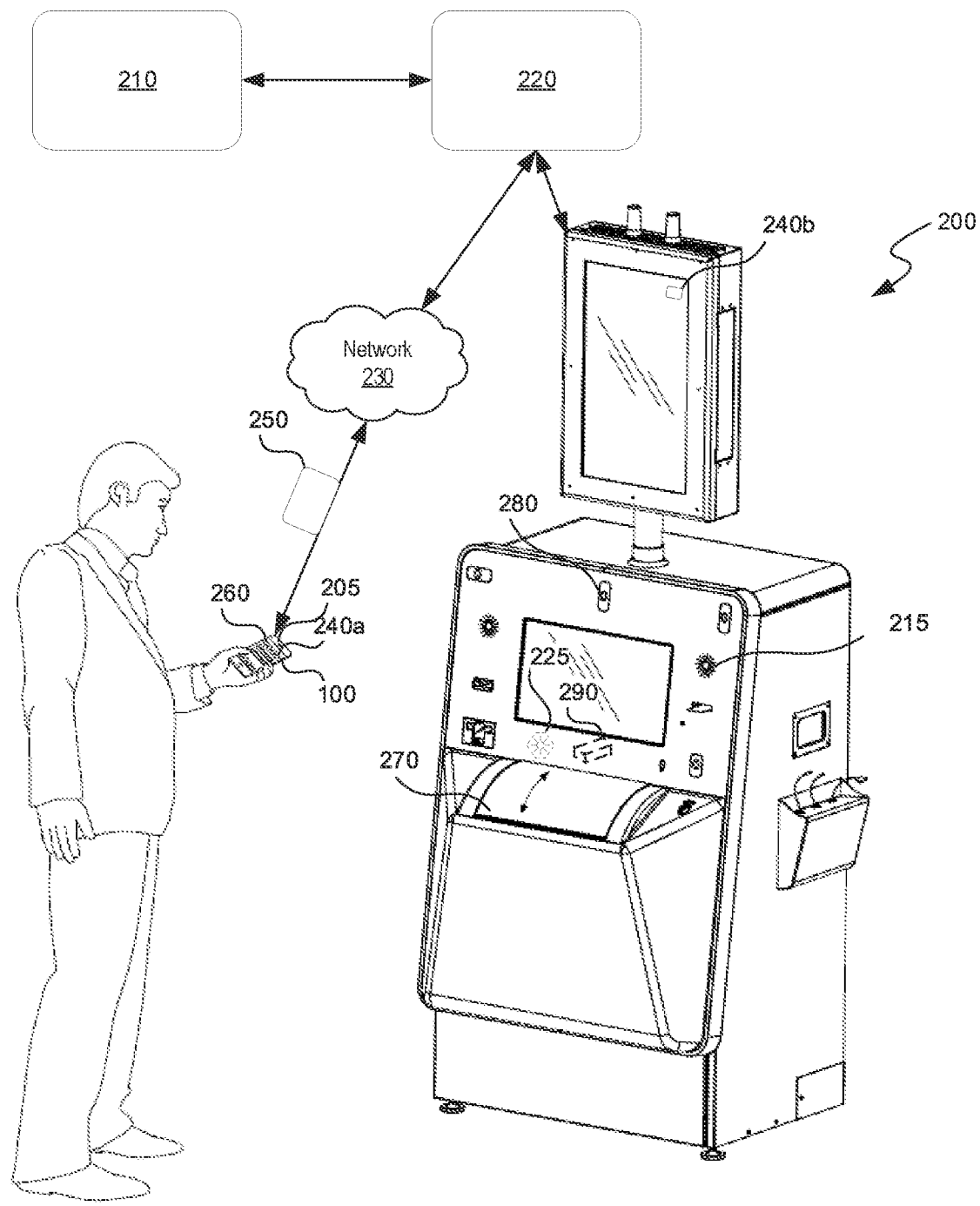
FIG. 2 is a partially schematic isometric view of a kiosk for recycling and/or other processing of mobile phones and other electronic devices, in accordance with some embodiments of the present technology.

If the user accepts the offer presented by the application, the user is given a menu of options, which can include a list of nearby reader devices (e.g., the kiosk 200, the evaluator device 300, etc.) along with instructions on how to present the device to the reader device to complete a sale/exchange/recycle transaction. The instructions can prompt the user to visit one of the kiosk 200 of their choosing, and while present at the kiosk 200, to activate the application. Alternatively, if the user is in the process of presenting the device 100 to the operator of the evaluator device 300, the instructions can prompt the user to activate the application at that time. Alternatively, an option in the menu of options displayed by application can instruct the user to provide the device 100 to an operator of the evaluator device 300 so that the operator of the evaluator device 300 can activate the application. In another embodiment, the application 110 can notify a third party, for example, a "phone collector," to collect the device 100 from the user. The phone collector can collect one or more devices 100 from one or more users and can sell/exchange/recycle one or more devices 100 at the same time by bringing them to a kiosk 200. With reference to FIG. 2, in some embodiments the kiosk 200 can include one or more internal cameras 290 that can read multiple device display screens at once while inside the kiosk 200 to facilitate evaluation of multiple devices 100. In this embodiment, the user can be paid electronically through an associated account.

Figure 4:
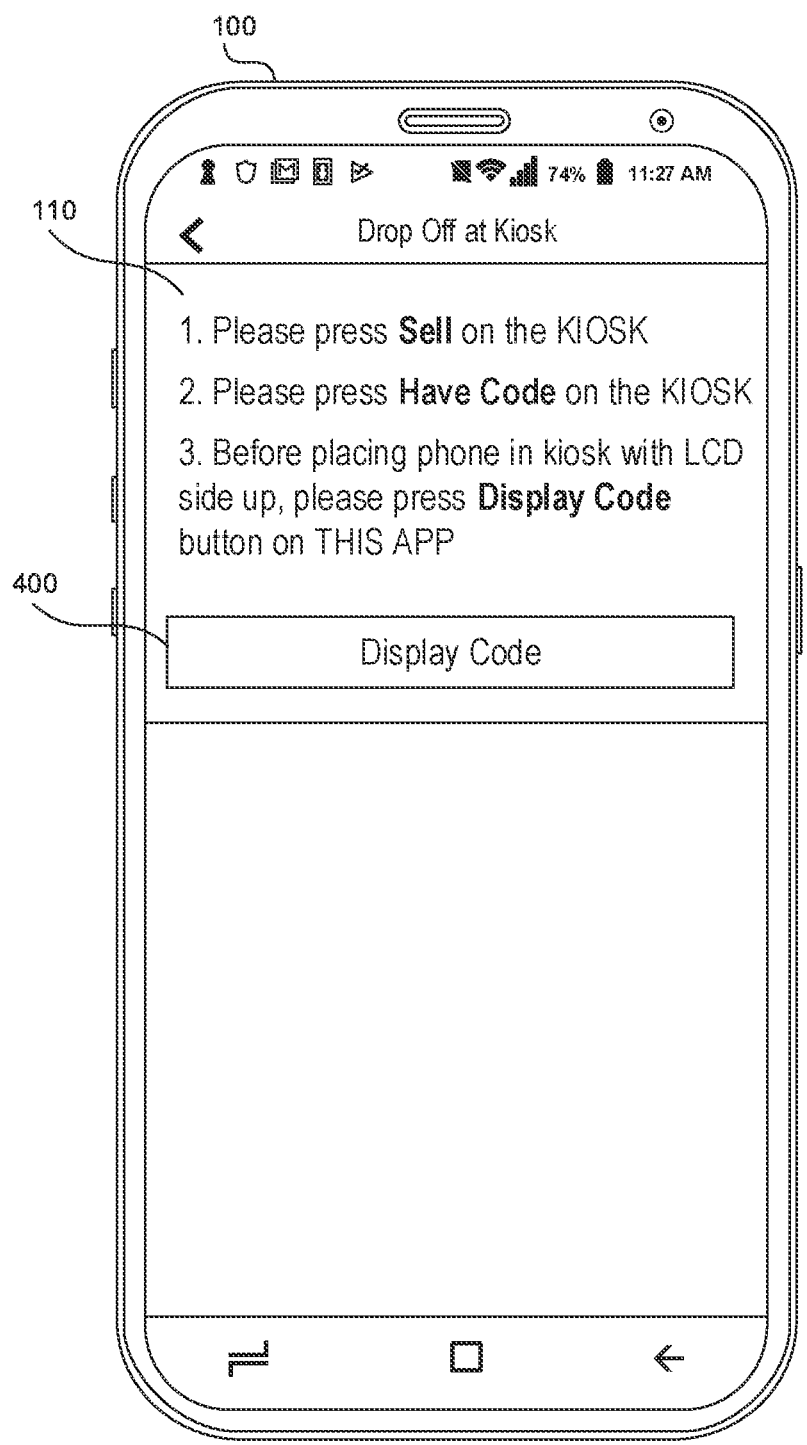
FIG. 4 shows a user interface presented by a mobile application to initiate generation of temporally changing information, in accordance with some embodiments of the present technology.

Returning to FIG. 1, in any of the embodiments described above, the application 110 can present an option 120 to enable the user to submit the device to a kiosk or other evaluator device. Upon selecting option 120, the application can display a user interface as illustrated in FIG. 4. The terms "reader device" and "evaluator device" are used interchangeably herein.

FIG. 4 shows a user interface to guide a user to submit the device 100 to an evaluator device, in accordance with some embodiments of the present technology. The user interface illustrated in FIG. 4 guides a user through a series of steps to interact with the evaluator device (e.g., the kiosk 200) before the user can submit the device to the evaluator device. Upon selecting option 400 on the user interface of application 110, the application 110 can cause the device to present temporally changing information. For example, the application can cause the device to display one or more QR codes. In another example, the application can cause the device to emit one or more audio signals. In another example, the application can cause the device to present a video with audio and/or visual information. The temporally changing information comprises a set of temporally changing indicia, as discussed above. Each indicator in the set of temporally changing indicia can be machine-readable, human-readable, or both. For example, the temporally changing information comprises a sequence of QR codes 520 (FIG. 5C) that change over time. In another example, the temporally changing information comprises a series of visible codes. The visible codes can include an image that has been imperceptibly modified to include the temporally changing information. For example, an image shown on the display of the device 100 can include embedded information such as text or graphics indicating the code. The embedded information can be imperceptible to a human observer; however, the information can be detected by a reader device, e.g., the kiosk 200 in FIG. 2 or the evaluator device 300 in FIG. 3.

Figure 5A:
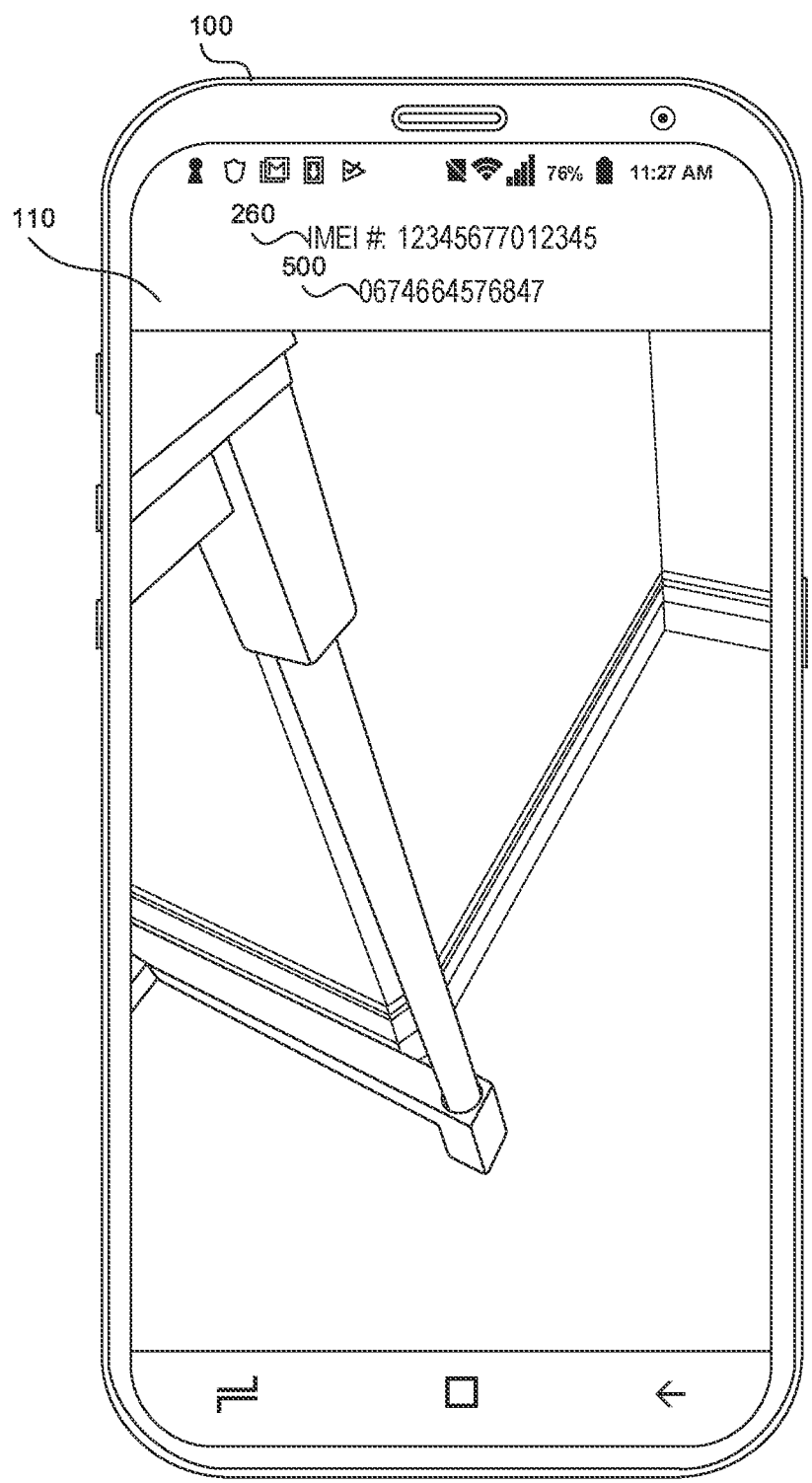
FIGS. 5A-5C show examples of temporally changing information, in accordance with some embodiments of the present technology.
Figure 5B:
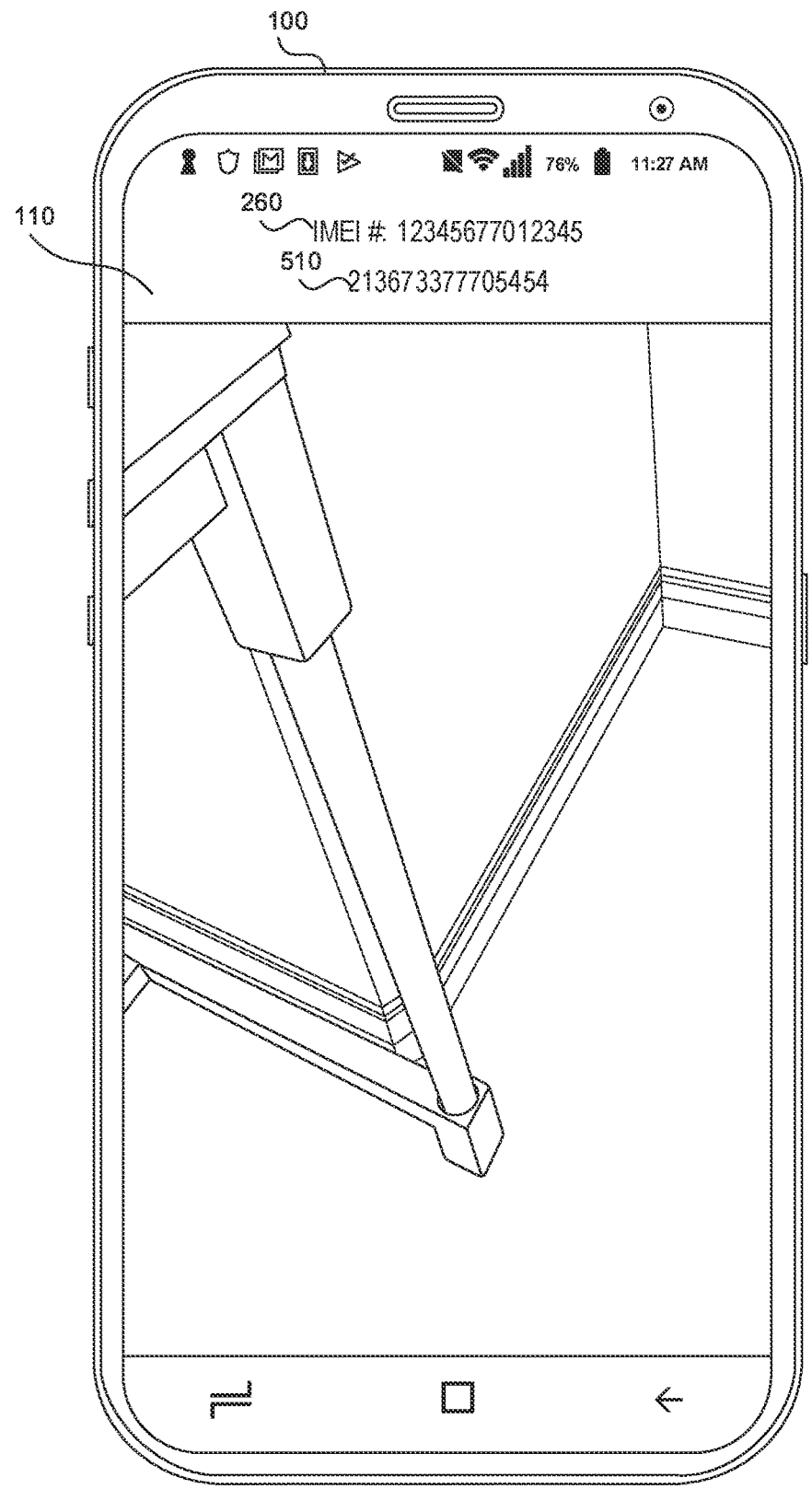
Figure 5C:
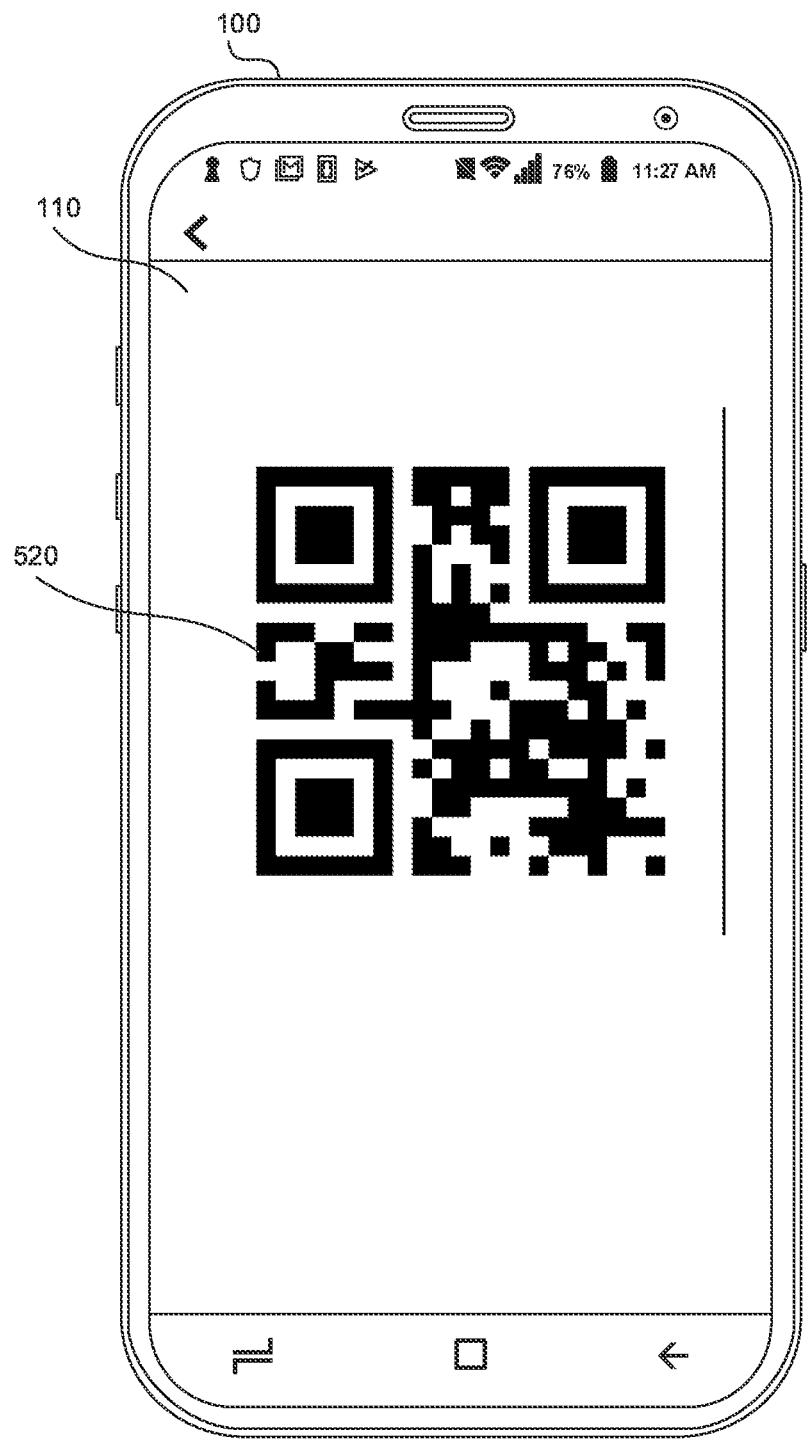

FIGS. 5A-5C show temporally changing information, in accordance with some embodiments of the present technology. The temporally changing information shown in FIGS. 5A-5C includes indicia 500, 510, 520, respectively, shown on the display screen of the device 100. The indicia 500, 510, 520 showing on the display screen of the device 100 refreshes periodically at particular intervals, for example, every 2 seconds, 10 seconds, etc. The user can present the device 100 to the reader device 200, 300 with the indicia 500, 510, 520 showing on the device screen. The interval duration for displaying the indicia and/or the number of intervals to be evaluated can depend on one or more factors, such as cost of the device, geographic location of device/user, telecommunications carrier associated with the device, prior history of user of the device, time of year (e.g., holidays, summer, etc.), and so on. For example, simpler and shorter intervals can be selected for device types assessed to be less valuable. As another example, for a low value device (e.g., valued at <$50) the reader device (e.g., kiosk) may only look for 1 interval, whereas for a high-value device (e.g. valued at >$250), the reader device would wait for at least four intervals to match in a continuous 20 seconds time period before proceeding with the transaction.

The temporally changing information can be encoded using various communication signals such as an audio signal, a magnetic signal, an electromagnetic polarization signal, a tactile signal, an electromagnetic signal, etc. The reader device 200, 300 can acquire the temporally changing information from the device using appropriate sensors/readers 205, 215 in FIG. 2 such as cameras, microphones, polarized light detectors, magnetic sensors, tactile sensors, antennas, etc. Labels 205, 215 can represent various sensors as described above such as cameras, microphones, polarized light detectors, magnetic sensors, tactile sensors, antennas. The reader device 200, 300 can enable and/or disable one or more sensors/readers based on the indicia type included in the temporally changing information. For example, if the temporally changing information is an infrared electromagnetic signal, the reader device 200, 300 can acquire the information using one or more infrared antennas, receivers, etc. If the temporally changing information is encoded using light polarization, the reader device 200, 300 can acquire the information using one or more polarized light detectors. If the temporally changing information is encoded using a magnetic signal, the reader device 200, 300 can acquire the information using one or more magnetic sensors. If the temporally changing information is encoded using an electromagnetic signal, the reader device 200, 300 and the device 100 can communicate using Wi-Fi, radiofrequency, infrared frequency, cellular telecommunication network, etc.

If the temporally changing information is encoded using an image format, such as a QR code, or video, the reader device 200, 300 can acquire the information using one or more cameras. For example, when the reader device is the kiosk 200, the one or more of the kiosk's external or internal cameras 280, 290 in FIG. 2 can read the temporally changing information 500, 510, 520 shown on the device 100. If the kiosk's external camera 280 reads the indicia 500, 510, 520, the kiosk 200 can open a door 270 enabling the user to place the device 100 in the inspection area of the kiosk for further evaluation and/or confirmation of the condition of the device 100 and, if appropriate, remuneration of the user. As another example, when the reader device is an evaluator device 300, the evaluator device cameras 310 can read the temporally changing information 500, 510, 520 shown on the device 100. The evaluator device 300 can verify the temporally changing information 500, 510, 520, as described in this application, and can provide a notification to the user of the evaluator device that the device 100 has been verified and can be collected.

The reader device 200, 300 can acquire one or more information samples of the temporally changing information from the device. For example, the reader device 200, 300 can take a single picture or video of the indicia 500, 510, 520, thus recording only a single indicator in the temporally changing information. The number of information samples can depend on one or more factors, such as the expected price of the evaluated device, the attributes of the device (e.g., make, model, telecommunications service provider, and so on), location of the evaluator device, type of evaluator device (e.g., kiosk 200 or electronic device 300), attributes of evaluator device, pattern(s) of consumer behavior, and so on.

Based on the single indicator 500, the reader device 200, 300 can determine whether the single indicator contains the necessary authentication information. For example, the necessary authentication information can include a unique identifier 260 associated with the device (examples discussed above) and a proximity indication that the device is proximate to the reader device 200, 300. The reader device 200, 300 can compare unique identifier information gleaned from the temporally changing information 500, 510, 520 against stored information (e.g., information retrieved from a remote database 210 in FIG. 2) to confirm that the device 100 has previously been evaluated by a user via the mobile application 110. In some embodiments, when the device 100 is in the vicinity (e.g., within a threshold distance) of the reader device 200, 300, one or more of the following can be visible on the display screen of the device 100: the date/time, the IMEI or hardware ID, or the temporally changing information 500, 510, 520. If the reader device is a kiosk 200, the device 100 can be placed inside the inspection area of the kiosk when displaying this information (e.g., the date/time, the IMEI or hardware ID, and/or the temporally changing information 500, 510, 520). Alternatively, the device 100 can also be positioned in front of the kiosk camera 280 when displaying the above information. In other words, the kiosk 200 can use either the external camera 280 (and/or other sensor) or the internal camera 290 (and/or other sensor) to determine whether the single indicator contains the necessary authentication information.

The proximity indication that the device 100 is proximate to the reader device 200 can be based on one or more factors, such as the date/time, ambient temperature, GPS coordinates, ambient air pressure, Wi-Fi identifier of the reader device 200, 300, a locally generated signal, ambient noise signal, ambient illumination signal, body heat signature, or other parameters that are contemporaneously common to the device and the reader device. In some embodiments, the proximity indication 240 is a value 240a, that can be measured independently by the device 100 and a value 240b, that can be measured independently by the reader device 200, 300. The reader device 200, 300 can determine a match between the proximity indications 240a and 240b within a specified tolerance. For example, if the temporally changing information 500, 510, 520 produced by the device 100 specifies a time of 2:22:20 p.m. (e.g., proximity indication 240a), while the reader device 200, 300 has a time of 2:22:27 p.m. (e.g., proximity indication 240b), the reader device can obtain the tolerance, which can be 10 seconds. Since 2:22:20 p.m. and 2:22:27 p.m. are within 10 seconds of each other, the reader device 200, 300 can determine that the reader device and the device 100 are proximate to each other.

The proximity indication that the device 100 is proximate to the reader device 200, 300 ("proximity indication" 240a, 240b) is important to avoid fraud. For example, in an attempt to cheat the system, a user can record a video of temporally changing information comprising a price quote of a first device and try to use that video to sell a lower quality second device. The reader device 200, 300 can detect the attempted fraud because the temporally changing information presented via the video displayed on the second device comprises a proximity indication that the expensive first device was proximate to the reader device 200, 300, not that the cheaper second device is currently proximate to the reader device. Consequently, the reader device will fail to identify the second device and thus reject the second device.

For example, the proximity indication 240 can include a current timestamp. If the temporally changing information 500, 510, 520 includes the time when the more expensive device was proximate to the reader device 200, 300, the reader device can detect, at the time of the attempted fraud, that the time in the temporally changing information does not match the current time. Similarly, if the proximity indication 240 includes the current ambient temperature and/or current air pressure, the reader device 200, 300 can detect a discrepancy between the ambient temperature and/or air pressure in the temporally changing information 500, 510, 520 and the currently measured ambient temperature and/or air pressure. Consequently, the reader device 200, 300 can refuse to accept the device 100. Similarly, the proximity indication 240 can be GPS coordinates. The reader device 200, 300 can be mobile, and the location of the reader device can change. Consequently, the user attempting to commit fraud can record temporally changing information containing GPS coordinates of the reader device 200, 300, when the reader device 200, 300 was located at a different location. Alternatively, there can be multiple reader devices 200, 300, and the user attempting to commit fraud could have recorded temporally changing information containing GPS coordinates of a different reader device. When the user tries to submit false temporally changing information containing incorrect GPS coordinates to the reader device 200, 300, the reader device 200, 300 can refuse to accept the device because the GPS coordinates contained in the temporally changing information do not match the GPS coordinates of the reader device.

In another example, the proximity indication 240 can include a currently generated signal that is locally available. Either the reader device 200, 300 or the device 100 can generate the communication signal. The communication signal can take on various forms, as described in this application. The other device can record the signal and extract information from the signal. The other device can include the extracted information in the temporally changing information 500, 510, 520. For example, the reader device 200, 300 can make a sound at a frequency such as 1500 Hz. The device can determine the frequency of the sound and include the determined frequency in the indices 500, 510, 520. The frequency of the sound can change to deter fraud. In another example, either the reader device 200, 300 or the device 100 can show a visual index. The device 100 can include a number obtained from the visual indicator and the indicia 500, 510, 520 presented to the reader device 200, 300. The reader device 200, 300 can verify that the temporally changing information 500, 510, 520 contains the correct number.

Several additional examples of fraud, such as attack scenarios and their prevention, are disclosed below. In a first example, a user attempting to commit fraud can obtain a high-value device and a device 100 that is cheaper than the high-value device. In the high-value device, the user can disable automatic date and time, set the system time for 1 minute in the future, and display the temporally changing information. This gives the user 1 minute to trade in the device 100 in place of the high-value device. On the device 100, the user can record and play back the video of the temporally changing information 500, 510, 520 that was displayed on the high-value device. To prevent this type of attack, the application 110 running on the high-value device can use GPS time instead of system time, thus rendering any tampering with the system time useless. When obtaining a GPS signal indoors may be difficult, the application 110, instead of obtaining the GPS time, can detect that the user has disabled automatic date/time and can refuse to generate the temporally changing information 500, 510, 520.

In a second example, a user attempting to commit fraud can have the high-value device display the temporally changing information 500, 510, 520, and the device 100 can mirror the display of the high-value device screen. To prevent mirroring, the reader device 200, 300 can perform operations to ensure that the device screen is responsive while showing the temporally changing information 500, 510, 520. For example, the kiosk dome lighting 225 can emit a flash to ensure that the device screen darkens in response to the lighting. By contrast, when the device screen is in mirror mode, the device screen would not adjust brightness in response to the flash.

In a third example, a user attempting to commit fraud can create an application to display QR codes of high-value devices on the device 100. To avoid re-creation of the temporally changing information algorithm, the server 220 can transmit a universally unique identifier (UUID) 250 and an encryption key via a secure network connection 230 in FIG. 2 to the application 110. The UUID 250 can be unique to the device 100.

The UUID 250 is a 128-bit or 256-bit label used for information in computing systems. When generated according to the standard methods, UUIDs are, for practical purposes, unique. Their uniqueness does not depend on a central registration authority or coordination between the parties generating them, unlike most other numbering schemes. While the probability that a UUID will be duplicated is not zero, it is close enough to zero to be negligible. Thus, anyone can create a UUID 250 and use it to identify something with near certainty that the identifier does not duplicate one that has already been, or will be, created to identify something else. Information labeled with UUIDs by independent parties can therefore be later combined into a single database or transmitted on the same channel, with a negligible probability of duplication. The UUID 250 and encryption key can expire after one use or five days (two-day expiration plus a three-day grace period).

The temporally changing information 500, 510, 520 can be encrypted with an encryption key and can include the UUID 250 and the proximity indication 240. The proximity indication 240 and the UUID 250 can be 256 to 512 encrypted bytes long.

The reader device 200, 300 can perform an additional verification that the UUID 250 belongs to the device 100. When the server 220 generates the UUID to send to the device 100, the server can record the type of device to which the UUID 250 is sent. The type of the device can be iPhone® 10, Android®, etc. Each type of device has a specific width, height, and curvature. The server 220 can store the device dimensions in the database 210 along with the UUID 250. When the reader device 200, 300 receives the device 100, the reader device 200, 300 can confirm device dimensions such as width, height, and/or curvature to make sure that the device dimensions match the device dimensions stored in the database 210. If the dimensions of the device 100 received at the reader device 200, 300 do not match the expected dimension stored in the database 210, the reader device can refuse to accept the device. If the reader device 200, 300 verifies the UUID 250 incorrectly, subsequently, a UUID of each device received at the reader device 200, 300 can be verified by a human operator.

The application 110 can combine the unique identifier 260 associated with the device 100, the proximity indication 240, and/or the UUID 250 to generate temporally changing information 500, 510, 520. For example, to generate the temporally changing information, the application 110 can interleave the digits of the unique identifier 260 and the proximity indication 240. In a more specific example, the unique identifier 260 can be the IMEI, which is 15 digits, and the proximity indication 240 can be the current time including two digits representing the hour and two digits representing the minutes. Consequently, to interleave the unique identifier 260 and the proximity indication 240, the application 110 can put a digit of the proximity indication 240 after every 4 digits of the unique identifier 260, until the end is reached. For example, if the unique identifier 260 is 012345678901234 and the proximity indication 240 is 0123, the interleaved representation (with the proximity indication digits in bold and underlined) can be 0123045671890122343. Other interleaving algorithms are possible. For example, the digits of the unique identifier 260 are located at predetermined positions such as the last four positions, first, sixth, seventh, and eleventh positions, etc.

In addition to generating a single secure index, the application 110 can generate a set of temporally changing indicia 500, 510, 520, where one indicator value 510 in the set depends on a prior indicator value 500. The previous indicator 500 can be the immediately preceding indicia to the subsequent indicator 510. For example, the initial indicator value 500 in the set of temporally changing indicia 500, 510, 520 can be generated as described above. The indicator value 510 can be generated using the unique identifier 260, the proximity indication 240, and a number that depends on the previous indicator value 500. For example, the number can be the sum of the digits of the previous indicator value 500. The sum of all the digits of the previous indicator value 500 can be 2032. Consequently, the number 2032 is included in the indicator value 510 by, for example, interleaving the digits of the number 2032 into the indicator at predetermined locations. In another example, the number can be the previous indicator value 500 divided by 100, or the previous indicator value modulo 100. Consequently, the resulting number is included in the indicator value 510 by, for example, interleaving the digits of the resulting number into the indicator at predetermined locations.

As discussed above, the reader device 300 can use the camera 310, and the reader device 200 can use one or more of the cameras 280, 290, to obtain and record the temporally changing information 500, 510, 520. If the reader device is the kiosk 200, the reader device can use the external camera 280 to scan several instances of the indices 500, 510, 520 before inviting the user to put the device 100 inside the kiosk, where the kiosk can do further scanning of the device and the temporally changing information. In some embodiments, the user can press a button on the kiosk 200 to open the door 270 to the inspection area of the kiosk and place the device 100 inside the kiosk 200. Or, to avoid contact with the kiosk 200, the user can present valid indicia 500, 510, 520 to the external kiosk camera 280, and upon verifying one or more of the indicia the kiosk 200 can open the door 270 automatically.

In some embodiments, the device 100 can be factory reset upon being evaluated remotely from the reader device 200, 300, and thus cannot present the temporally changing information 500, 510, 520 to the reader device. To resolve this problem, the server 220 can transmit (e.g., via email, text, or other means) a set of temporally changing indicia to the user, and the user can present one or more indicia from the received set on a different device. In another embodiment, when the device 100 reboots, upon factory reset, the device can present an option to a user, which upon selection presents the temporally changing information 500, 510, 520 to the reader device 200, 300.

After successfully verifying the identity of the device, one or more further acts can be performed to submit the device to the reader device. For example, when the reader device is a kiosk 200, the kiosk 200 can instruct the user to place the device 100 in the internal inspection area of the kiosk 200, which can run additional visual inspections via the internal cameras 290 to confirm that the desired device 100 has been placed inside the kiosk 200 an to evaluate, e.g., the condition of the device display screen (e.g. an LCD), etc. The kiosk 200 can take at least two additional pictures of the LCD while the application 110 is running, to confirm the expected indicia 500, 510, 520 is visible. Not only can the kiosk 200 evaluate the device display screen glass to see if the glass is cracked, but the kiosk can also grade the LCD that's underneath the glass. To grade the LCD, the kiosk 200 can detect water damage, which makes the LCD pinkish, the kiosk can detect hot pixels, which are always white, or the kiosk can detect cold pixels, which are always black. Such kiosks are operated by ecoATM, LLC, the assignee of the present application, and aspects of these kiosks are described in, for example: U.S. Pat. Nos. 15/195,828, 16/357,041, 17/137,261, 15/130,851, 15/176,975, 16/794,009, 63/070,207 which are incorporated herein by reference in their entireties.

As another example, when the reader device is the evaluator device 300, the evaluator device can use the camera 310 of the evaluator device 300 to run an additional visual inspection of the device 100. For example, the evaluator device 300 can take at least two additional pictures of the LCD while the application 110 is running on the screen, to confirm the expected indicia 500, 510, 520 is visible. Not only can the evaluator device 300 grade the glass to see if the glass is cracked, but the evaluator device can also grade the LCD that's underneath the glass. To grade the LCD, the evaluator device 300 can detect water damage, which makes the LCD pinkish, the evaluator device can detect hot pixels, which are always white, or the evaluator device can detect cold pixels, which are always black.

The application 110 can contain software to ensure that the device screen does not go to "sleep" during further evaluation and can also increase the brightness of the screen to improve visibility.

Figure 6:
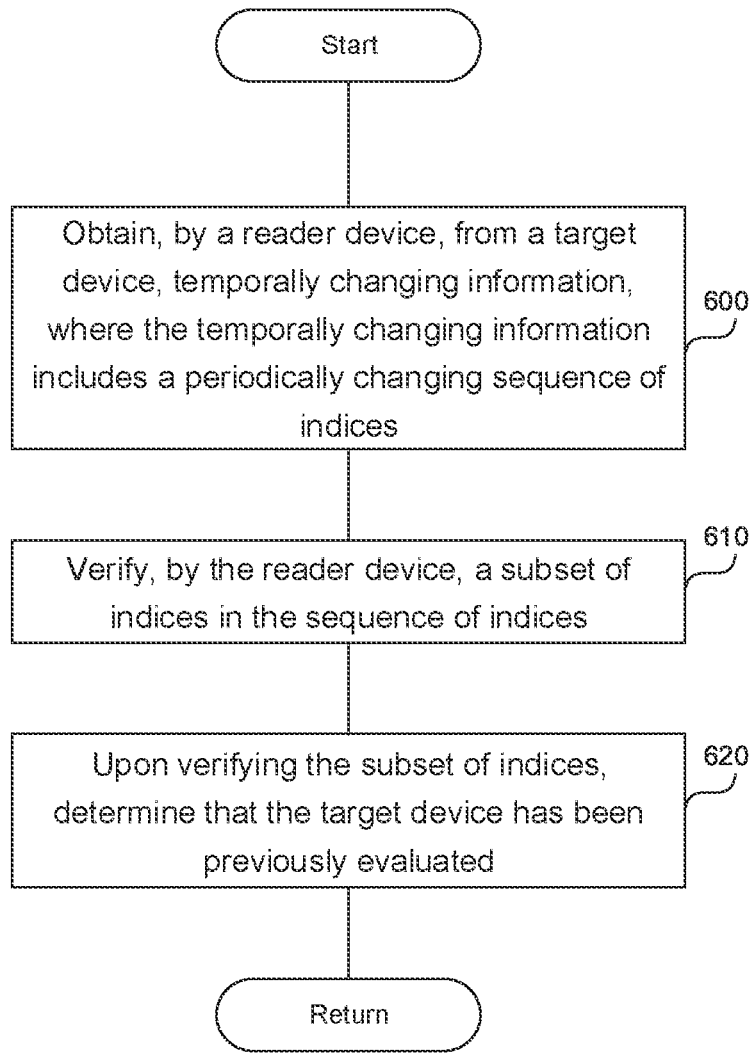
FIG. 6 is a flowchart of a method to determine whether a device has been previously evaluated, according to some embodiments of the present technology.

FIG. 6 is a flowchart of a method 600 to determine whether a device has been previously evaluated, according to another embodiment of the present technology. In block 610, the processor can obtain, by the reader device, from an evaluated device, temporally changing information, where the temporally changing information includes a periodically changing sequence of indicia. Each indicator in the sequence of indices can include a unique identifier associated with the evaluated device, described in this application, and a proximity indication that the evaluated device is proximate to the reader device ("proximity indication"). An indicator in the sequence of indices can be based on a previous indicator in the sequence of indices. The unique identifier can be associated with the price of the evaluated device. The unique identifier can include an IMEI associated with the evaluated device, a UUID, or a model number associated with the evaluated device. The reader device can include a kiosk, a mobile phone, a tablet, a laptop computer, a smartwatch, etc. The temporally changing information can be encoded using various communication signals, as described in this application.

The proximity indication can include a timestamp, GPS coordinates, an ambient temperature, a signal, and/or an ambient air pressure. The processor can measure or generate the proximity indication. For example, the processor can measure the timestamp, for example, current time, GPS coordinates, ambient temperature, and/or ambient air pressure. The processor can generate the communication signal. The communication signal can take on various forms, as described in this application. For example, the audio signal can be a subsonic or a supersonic audio signal that the reader device and the evaluated device can detect. When the signal is a visual signal, the reader device can display a QR code that both the evaluated device and the reader device can detect.

The processor can obtain the contents of the signal by, for example, detecting the signal, or by knowing how the signal was generated. The processor can generate the indicator based on the signal. For example, the generated audio signal can have a number encoded in it. The processor can extract the number and include the extracted number in the index. Similarly, the generated visual signal can include an alphanumeric string. The alphanumeric string can be hidden in an image or can be explicit in the image. The processor can extract the alphanumeric string and include the alphanumeric string in the index.

In block 620, the processor can verify, through the reader device, a subset of indices in the sequence of indices, where the subset of indices includes the previous indicator and the current index. To verify the subset of indices, the processor can obtain the previous indicator and the current indicator in the sequence of indices. The processor can verify that the unique identifier is contained in at least one of the previous indicators and the current index, that the unique identifier is stored in a database associated with the reader device, that at least one of the previous indicators and the current indicator contains the proximity indication, and that the indicator in the sequence of indices is based on the previous indicator in the sequence of indices.

Verifying that the indicator is based on the previous indicator enables the processor to verify that the evaluated device is not displaying a static image of a previously recorded valid index, and enables the processor to verify that the evaluated device is running the desired application that knows the secret algorithm for generating the sequence of indices. The reader device can verify multiple indices in a sequence such as 2, 3, 4 indices, etc. The higher the number of indices verified, the lower the likelihood that the evaluated device is fraudulent.

Alternatively, the processor can verify a single indicator value via the reader device. To verify the indicator value, the processor can verify that the unique identifier is contained in the index, that the unique identifier is valid (e.g., it is stored in a database associated with the reader device), and that the indicator includes the proximity indication that the device is proximate to the reader device. For example, by verifying that the unique identifier is contained in the indicator and that the unique identifier is stored in the database, the processor verifies that the device has been previously evaluated and is currently being traded in for payment. By verifying that the indicator includes the proximity indication that the device is proximate to the reader device, the processor verifies that the device is not playing back a previously recorded indicator from a different, more expensive device.

In block 630, upon verifying the subset of indices, the processor can determine that the evaluated device has been previously evaluated. The processor can obtain, through the reader device, the price of the evaluated device, based on the unique identifier associated with the evaluated device. For example, a database can store the unique identifier and the price offered to the user when the user remotely evaluated the evaluated device. In another example, the processor can retrieve the price previously offered to the user during the evaluated device evaluation. Upon obtaining the price of the evaluated device, the processor can facilitate compensation (e.g., funds, points, credits, and so on) to a user of the evaluated device. For example, the processor can facilitate transfer of funds (or other renumeration) through an electronic payment system, such as PayPal, to the user's account.

Upon obtaining the price of the evaluated device, the processor can compensate a user associated with the evaluated device by, for example, electronically transferring funds to the user, offering a cash payout to the user, offering credit, or any other way described in this application. The user can be the owner of the evaluated device, and/or the user can be the person submitting the evaluated device.

To increase the security of each indicator in the temporally changing information, the processor can interleave the unique identifier and the proximity indication. The unique identifier and the proximity indication can be a string of alphanumeric characters. The processor can obtain the unique identifier and the proximity indication and separate the unique identifier into a first group of characters, and the proximity indication into a second group of characters. The characters can be individual alphanumeric characters such as digits.

The processor can generate the indicator by interleaving the first group of characters and the second group of characters. The interleaving can be done by alternating every character, alternating every couple of characters, or putting the second group of characters at previously designated locations. The processor can check whether the generated indicator matches the index. If so, the processor can determine that the indicator is correct.

In another embodiment, instead of generating the index, the processor can obtain the interleaving algorithm, the unique identifier, and the proximity indication. The processor can check that the correct character is at the correct place based on the interleaving algorithm, the unique identifier, and the proximity indication.

To increase the security of the temporally changing information, the processor can base each indicator in the temporally changing information on a previous indicator in the temporally changing information. The processor can obtain the unique identifier, the proximity indication, and the previous index. The processor can create a short indicator based on the previous index. The short indicator can be the sum of characters, or the sum of digits of the previous index. If the previous indicator includes alphanumeric characters, the processor can represent the characters using American Standard Code for Information Interchange (ASCII) code, and can sum the ASCII representation. The short indicator can be the previous indicator modulo 100. The short indicator can be the sum of characters or the sum of digits of the previous indicator modulo 1000.

The processor can separate the unique identifier into a first group of characters, and the proximity indication into a second group of characters. The processor can generate the indicator by placing the first group of characters, the second group of characters, and the short indicator in predetermined character locations. For example, the processor can interleave the first group and the second group to obtain a representation and add the characters of the short indicator at the end of the representation. In another example, to generate the index, the processor can separate the short indicator into a third group of characters, and interleave the first, the second, and the third group of characters by putting the characters in predetermined locations.

The processor can further prevent fraud by including a UUID associated with the evaluated device in the index. The processor can obtain the UUID from the index. The processor can obtain a physical description associated with the UUID. For example, a database can store the UUID and the physical description of the UUID, such as the width, height, and/or curvature of the UUID. The processor can inspect the physical properties of the evaluated device to determine whether the physical properties of the evaluated device correspond to the physical description associated with the UUID. Similarly, the physical properties can include width, height, and/or curvature. Upon determining that the physical properties of the evaluated device correspond to the physical description associated with the UUID, the processor can verify the UUID. If the physical properties of the evaluated device do not match the physical description associated with the UUID, the processor can determine that the user is trying to commit fraud by substituting a cheaper device for a more expensive, previously evaluated device.

Reader Devices

Figure 3:
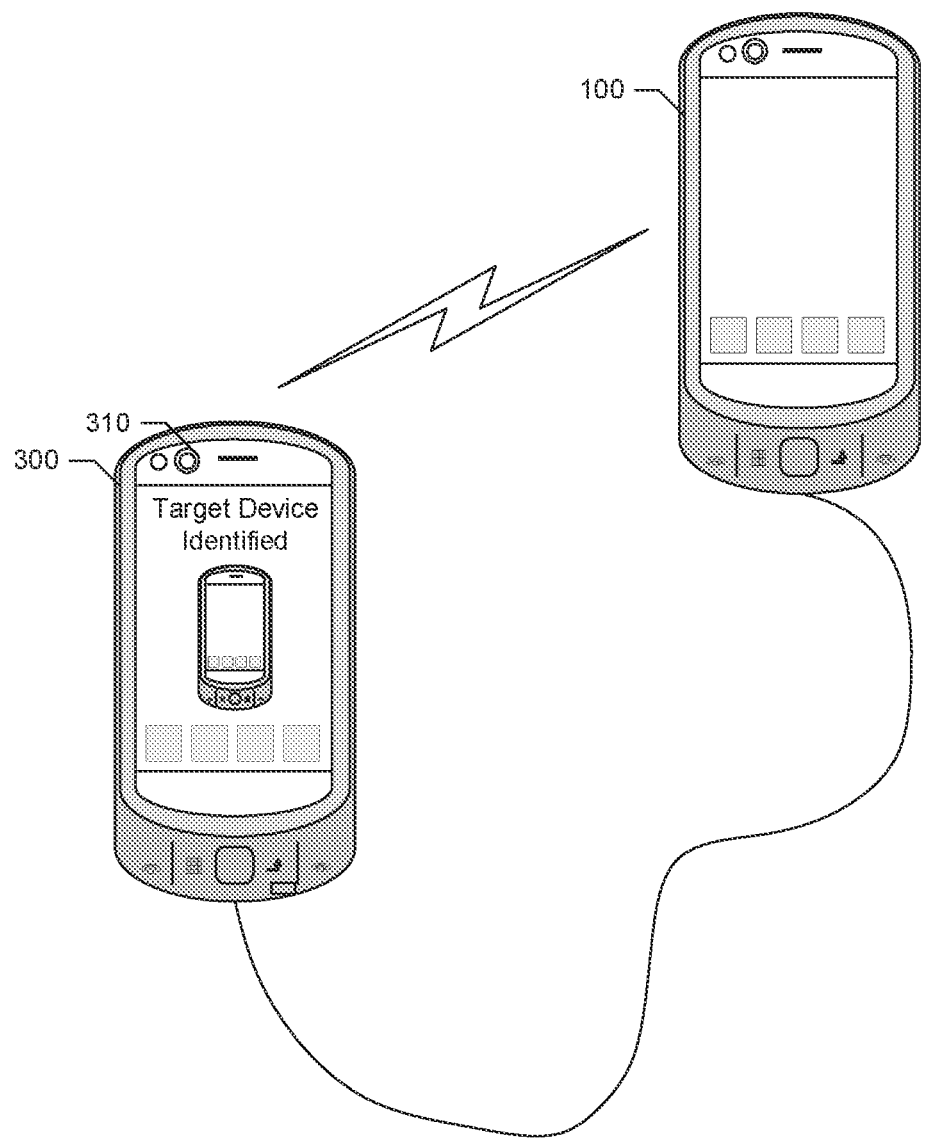
FIG. 3 shows an evaluator device evaluating an evaluated device, in accordance with some embodiments of the present technology.

In some embodiments, the reader device is a kiosk 200 for recycling and/or other processing of mobile phones and other consumer electronic devices, such as that illustrated in FIG. 2. In some embodiments, the reader device is an electronic device 300 of a third party authorized to evaluate and/or identify the electronic device 100, such as that illustrated in FIG. 3. Elements of FIGS. 2 and 3 are described above with reference to FIG. 1. As discussed above, the reader device 200, 300 can be configured to check the temporally changing information presented by the electronic device 100. Once the reader device 200, 300 verifies the temporally changing information, the system facilitates the collection of the evaluated device 100 via the reader device. In some embodiments, the system further facilitates compensation to the user of the evaluated device. For example, the system can facilitate the kiosk 200 to dispense compensation in the form of cash/gift card/pre-loaded debit card, etc. to a user of the evaluated device. As another example, the system can facilitate a reader device 200, 300 to transfer funds through an electronic payment system, such as PayPal, to the user's account. The automated kiosk and the evaluator device are further described in the U.S. Provisional Application Ser. No. 63/070,207, filed on Aug. 25, 2020, and incorporated herein by reference in its entirety.

Example Computing System

Figure 7:
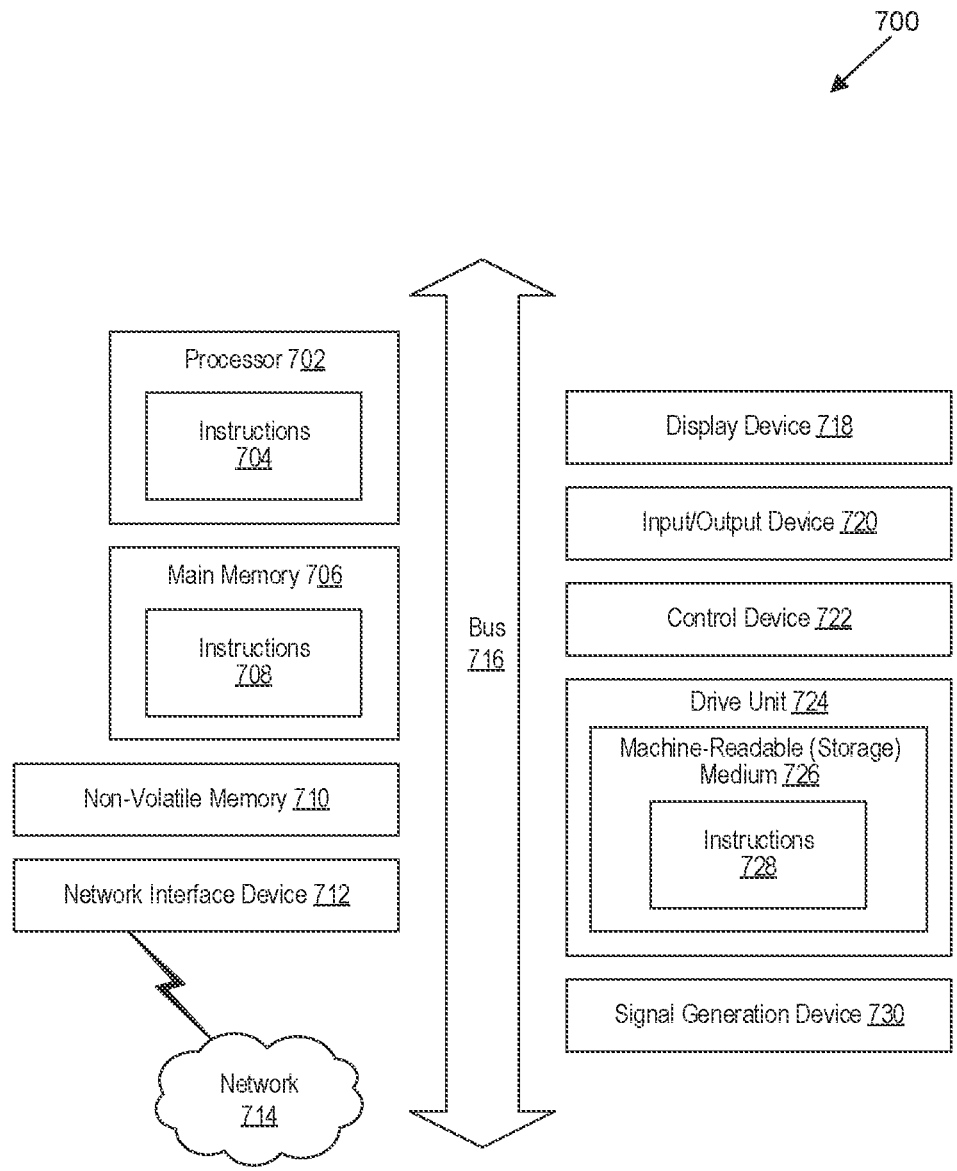
FIG. 7 is a block diagram that illustrates an example of a computing system in which at least some operations described herein can be implemented, in accordance with some embodiments of the present technology.

FIG. 7 is a block diagram that illustrates an example of a computing system 700 in which at least some operations described herein can be implemented. As shown, the computing system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computing system 700 is intended to illustrate a hardware device on which components illustrated or described relative to the examples of the Figures and any other components described in this specification can be implemented.

The processor 702 can perform the instructions described in this application, for example, the instructions described in FIG. 6. The processor 702 can be associated with the reader device 200 in FIG. 2, 300 in FIG. 3, the server 220 in FIG. 2, and/or the evaluated device 100 in FIGS. 5A-5C. The main memory 706, the non-volatile memory 710, and/or the drive unit 724 can store instructions executed by the processor 702. A network 714 can be used to communicate between the database 210 in FIG. 2, the server 220, the kiosk 200, and/or the evaluated device 100.

The computing system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computing system 700 can be an embedded computing system, a system-on-chip (SOC), a single-board computing system (SBC), or a distributed system such as a mesh of computing systems or include one or more cloud components in one or more networks. Where appropriate, one or more computing systems 700 can perform operations in real-time, near real-time, or in batch mode.

The network interface device 712 enables the computing system 700 to mediate data in the network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical discs, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Embodiments of the kiosk 200 and various features thereof can be at least generally similar in structure and function to the systems, methods, and corresponding features described in the following patents and patent applications, which are incorporated herein by reference in their entireties: U.S. Pat. Nos. 11,080,672, 10,860,990, 10,853,873, 10,572,946, 10,475,002; 10,445,708; 10,438,174; 10,417,615; 10,401,411; 10,269,110; 10,127,647; 10,055,798; 9,885,672; 9,881,284; 8,200,533; 8,195,511; and 7,881,965; U.S. patent application Ser. Nos. 17/645,039, 17/445,799; 17/445,821; 17/445,799; 17/445,178; 17/445,158; 17/445,083; 17/445,082; 17/125,994; 16/794,009; 16/788,169; 16/788,153; 16/719,699; 16/794,009; 16/534,741; 15/057,707; 14/967,183; 14/964,963; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; 13/113,497; U.S. Provisional Application Nos. 63/365,778, 63/267,911, 63/220,890, 63/220,381, 63/127,148, 63/116,020; 63/116,007; 63/088,377; 63/070,207; 63/066,794; 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further embodiments of the invention.

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents, applications, and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further, any specific numbers noted herein are only examples: alternative implementations may employ differing values or ranges.

Although the above description describes various embodiments of the invention and the best mode contemplated, regardless of how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or a continuing application.

We claim:

1. A method comprising:
obtaining, by a reader device of a kiosk configured to process electronic devices, from an electronic device, temporally changing information,
   wherein the temporally changing information includes a set of temporally changing indicators-indicia,
   wherein each indicator in the set of temporally changing indicators includes a unique identifier associated with the electronic device and a proximity indication that the electronic device is proximate to the reader device,
      wherein an indicator in the set of temporally changing indicators is based in part on a second indicator in the set of temporally changing indicators,
      wherein the unique identifier is based on one or more attributes of the electronic evaluated-device;
verifying, by the reader device, a subset of indicators in the set of temporally changing indicators, the subset of indicators including the second indicator and a current indicator, by:
   obtaining the second indicator and the current indicator in the set of temporally changing indicators;
   verifying that at least one of the second indicator and the current indicator includes the unique identifier;
   verifying that the unique identifier is stored in a database associated with the reader device;
   verifying that at least one of the second indicator and the current indicator includes the proximity indication that the electronic evaluated-device is proximate to the reader device; and
   verifying that the current indicator in the set of temporally changing indicators is based on at least one other indicator in the set of temporally changing indicators; and
upon verifying the subset of indicators, determining that the electronic evaluated device has been previously evaluated.

2. The method of claim 1, further comprising:
obtaining the unique identifier;
obtaining the proximity indication that the electronic device is proximate to the reader device;
separating the unique identifier into a first plurality of characters, and the proximity indication into a second plurality of characters; and
generating the second indicator by interleaving the first plurality of characters and the second plurality of characters.

3. The method of claim 1, further comprising:
obtaining the unique identifier;
obtaining the proximity indication;
creating a short indicator based on the second indicator;
separating the unique identifier into a first plurality of characters, and the proximity indication into a second plurality of characters; and
generating the current indicator by placing the first plurality of characters, the second plurality of characters, and the short indicator at predetermined character locations of the current indicator.

4. The method of claim 1, wherein the proximity indication at the electronic device is proximate to the reader device comprises one or more of: a timestamp, GPS coordinates, an ambient temperature, or an ambient air pressure.

5. The method of claim 1, further comprising:
generating, by the reader device, a signal comprising a visual signal or an audio signal; and
generating the second indicator based on content of the signal.

6. The method of claim 1, wherein the unique identifier comprises one or more of: an IMEI associated with the electronic device, a SIM number associated with the electronic device, an IMSI, a MSISDN, capacity, storage limit, carrier, subscriber information of the electronic device, or a make/model number associated with the electronic device.

7. The method of claim 1, wherein the current indicator comprises a QR code, a visual signal, an audio signal, an electromagnetic signal, a magnetic signal, an electromagnetic polarization signal, or a tactile signal.

8. The method of claim 1, wherein the current indicator includes a universally unique identifier associated with the electronic device, and wherein verifying the current indicator comprising:
obtaining the universally unique identifier from the current indicator;
obtaining a physical description associated with the universally unique identifier;
inspecting physical properties of the electronic device to determine whether the physical properties of the electronic device correspond to the physical description associated with the universally unique identifier; and
upon determining that the physical properties of the electronic device correspond to the physical description associated with the universally unique identifier, verifying the universally unique identifier.

9. At least one computer-readable storage medium, excluding transitory signals and carrying instructions, which, when executed by at least one data processor of a system, cause the system to:
obtain, by a reader device of a kiosk configured to process electronic devices, from an electronic device, an indicator,
wherein the indicator includes a unique identifier associated with the electronic device and a proximity indication that the electronic device is proximate to the reader device;
verify, by the reader device, the indicator by:
verifying that the indicator includes the unique identifier;
verifying that the unique identifier is stored in a database associated with the reader device; and
verifying that the indicator includes the proximity indication that the electronic device is proximate to the reader device; and
upon verifying the indicator, determine that the electronic device has been previously evaluated.

10. The computer-readable storage medium of claim 9, further comprising the instructions to:
obtain the unique identifier;
obtain the proximity indication that the electronic device is proximate to the reader device;
separate the unique identifier into a first plurality of characters, and the proximity indication into a second plurality of characters; and
generate the indicator by interleaving the first plurality of characters and the second plurality of characters.

11. The computer-readable storage medium of claim 9, further comprising the instructions to:
obtain the unique identifier;
obtain the proximity indication;
obtain a previous indicator,
wherein the previous indicator precedes the index indicator;
create a short indicator based on the previous-index indicator;
separate the unique identifier into a first plurality of characters, and the proximity indication into a second plurality of characters; and
generate the indicator by placing the first plurality of characters, the second plurality of characters, and the short indicator in predetermined character locations.

12. The computer-readable storage medium of claim 9, wherein the proximity indication that the electronic evaluated device is proximate to the reader device comprises a timestamp, GPS coordinates, an ambient temperature, or an ambient air pressure.

13. The computer-readable storage medium of claim 9, further comprising the instructions to:
generate a signal comprising a visual signal or an audio signal; and
generate the indicator based on content of the signal.

14. The computer-readable storage medium of claim 9, wherein the unique identifier comprises an IMEI associated with the electronic device, or a model number associated with the electronic device.

15. The computer-readable storage medium of claim 9, wherein the indicator comprises a QR code, a visual signal, an audio signal, an electromagnetic signal, a magnetic signal, an electromagnetic polarization signal, or a tactile signal.

16. The computer-readable storage medium of claim 9, wherein the indicator includes a universally unique identifier associated with the electronic device, wherein the instructions to verify the indicator comprise instructions to:
obtain the universally unique identifier from the indicator;
obtain a physical description associated with the universally unique identifier;
inspect physical properties of the electronic device to determine whether the physical properties of the electronic device correspond to the physical description associated with the universally unique identifier; and
upon determining that the physical properties of the electronic device correspond to the physical description associated with the universally unique identifier, verify the universally unique identifier.

17. A system comprising:
at least one hardware processor; and
at least one non-transitory memory storing instructions, which, when executed by the at least one hardware processor, cause the system to:
obtain from an evaluated device an indicator,
wherein the indicator includes a unique identifier associated with the evaluated device and a proximity indication that the evaluated device is proximate to a reader device of a kiosk configured to process electronic devices;
verify the indicator by:
verifying that the indicator includes the unique identifier;
verifying that the unique identifier is stored in a database associated with the reader device; and
verifying that the indicator includes the proximity indication that the evaluated device is proximate to the reader device; and
upon verifying the index indicator, determine that the evaluated device has been previously evaluated.

18. The system of claim 17, further comprising the instructions to:
obtain the unique identifier;
obtain the proximity indication;
separate the unique identifier into a first plurality of characters, and the proximity indication into a second plurality of characters; and
generate the indicator by interleaving the first plurality of characters and the second plurality of characters.

19. The system of claim 17, further comprising the instructions to:
obtain the unique identifier;
obtain the proximity indication;
obtain a previous indicator,
wherein the previous indicator precedes the indicator;
create a short indicator based on the previous indicator;
separate the unique identifier into a first plurality of characters, and the proximity indication into a second plurality of characters; and
generate the indicator by placing the first plurality of characters, the second plurality of characters, and the short indicator in predetermined character locations.

20. The system of claim 17, wherein the proximity indication that the evaluated device is proximate to the reader device comprises a timestamp, GPS coordinates, an ambient temperature, or an ambient air pressure.

21. The system of claim 17, further comprising the instructions to:
generate a signal comprising a visual signal or an audio signal; and
generate the indicator based on content of the signal.

22. The system of claim 17, wherein the unique identifier comprises an IMEI associated with the evaluated device, or a model number associated with the evaluated device.

23. The system of claim 17, wherein the indicator comprises a QR code, a visual signal, an audio signal, an electromagnetic signal, a magnetic signal, an electromagnetic polarization signal, or a tactile signal.

24. The system of claim 17, wherein the indicator includes a universally unique identifier associated with the evaluated device, wherein the instructions to verify the indicator comprise the instructions to:
obtain the universally unique identifier from the indicator;
obtain a physical description associated with the universally unique identifier;
inspect physical properties of the evaluated device to determine whether the physical properties of the evaluated device correspond to the physical description associated with the universally unique identifier; and
upon determining that the physical properties of the evaluated device correspond to the physical description associated with the universally unique identifier, verify the universally unique identifier.

* * * * *